United States Patent
De Kadt et al.

(10) Patent No.: US 10,951,540 B1
(45) Date of Patent: Mar. 16, 2021

(54) CAPTURE AND EXECUTION OF PROVIDER NETWORK TASKS

(71) Applicant: Amazon Technologies, Inc., Reno, NV (US)

(72) Inventors: Christopher Richard Jacques De Kadt, Seattle, WA (US); Andrew James Lusk, Western Cape (ZA); James Alfred Gordon Greenfield, Western Cape (ZA); Marc John Brooker, Seattle, WA (US); Neil Andrew Eriksson, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 677 days.

(21) Appl. No.: 14/579,757

(22) Filed: Dec. 22, 2014

(51) Int. Cl.
*H04L 12/911* (2013.01)
*H04L 29/08* (2006.01)

(52) U.S. Cl.
CPC .............. *H04L 47/70* (2013.01); *H04L 67/10* (2013.01)

(58) Field of Classification Search
CPC ......... H04L 47/70; H04L 67/10; H04L 43/50; H04L 67/34; H04L 41/18; G06F 11/3414; G06F 11/3688; G06F 11/3438; G06F 8/65; G06F 9/541; G06F 9/4843; G06F 9/45533; G06F 16/14; G06F 9/45512; G06Q 10/101
See application file for complete search history.

(56) References Cited

U.S. PATENT DOCUMENTS

| | | | |
|---|---|---|---|
| 7,627,821 B2 | 12/2009 | Klementiev | |
| 7,653,896 B2 | 1/2010 | Herdeg, III | |
| 8,239,374 B2 | 8/2012 | Narula et al. | |
| 8,355,316 B1* | 1/2013 | Lushear | H04L 43/0817 370/217 |
| 8,566,716 B2 | 10/2013 | Haynes et al. | |
| 2005/0160398 A1* | 7/2005 | Bjornson | G06Q 10/06 717/104 |
| 2008/0147453 A1 | 6/2008 | Kogan et al. | |
| 2011/0041140 A1* | 2/2011 | Harm | G06F 9/4843 719/318 |

(Continued)

OTHER PUBLICATIONS

Cloud computing, Wikipedia, Dec. 20, 2014, pp. 1-19. (Year: 2014).*
Macro recorder, Wikipedia, Oct. 24, 2014, pp. 1-2. (Year: 2014).*

*Primary Examiner* — Muhammad Raza
(74) *Attorney, Agent, or Firm* — Robert C. Kowert; Kowert, Hood, Munyon, Rankin & Goetzel, P.C.

(57) ABSTRACT

A provider network provides task capture and execution for tasks performed with respect to resources in the provider network. Task actions performed with respect to resources may be captured based on inputs to a provider network via a network-based service for the provider network in order to generate a recorded task. The recorded task may be stored for subsequent execution. In response to the detection of an execution event for the recorded task, the task actions may be performed as described in the recorded task. In some embodiments, task parameters and execution events may be defined for recorded tasks. Multiple recorded tasks may be linked together to be managed and executed as recorded task workflows. Recorded tasks may also be obtained that were recorded by other clients, or recorded for different provider networks.

18 Claims, 15 Drawing Sheets

(56) References Cited

U.S. PATENT DOCUMENTS

| | | | |
|---|---|---|---|
| 2013/0097651 A1* | 4/2013 | Rendahl | G06F 21/33 726/1 |
| 2013/0275940 A1* | 10/2013 | Park | G06F 8/34 717/105 |
| 2014/0068335 A1* | 3/2014 | Bromley | H04L 43/50 714/32 |
| 2015/0169821 A1* | 6/2015 | Peters | G06Q 10/101 703/1 |
| 2015/0188777 A1* | 7/2015 | Frost | H04L 67/34 709/223 |
| 2015/0254740 A1* | 9/2015 | Akolkar | B01F 7/00033 705/34 |
| 2016/0094483 A1* | 3/2016 | Johnston | H04L 47/827 709/226 |

* cited by examiner

CAPTURE AND EXECUTION OF PROVIDER NETWORK TASKS

BACKGROUND

Cloud-based infrastructure offers many advantages for companies, developers, or other entities that may implement new systems and technologies leveraging the accessibility, flexibility, and reliability. Many different types of services, systems, or functions may be implemented using cloud-based resources for client systems or devices. For example, cloud-based resources, such as virtual compute instances, may be used to implement a network-based service for external customers, such as an e-commerce platform. Cloud-based resources may also be used to implement a service or tool for internal customers, such as information technology (IT) service implemented as part of an internal network for a corporation. Cloud-based resources, such as virtual networks, may be used to direct or control network traffic in order to perform the various functions or tasks provided by the services or functions performed utilizing other cloud-based resources, in another example. Instead of investing resources in acquiring various hardware and software components, cloud-based resources may be procured to provide the infrastructure upon which these new systems and technologies may be built.

Cloud-based resources are often provided by a provider network, which may include many different types of network-based services that can be used to implement cloud-based infrastructure resources. Developers can request, provision, and configure various different cloud-based resources from the network-based services offered as part of the development of new systems and products. However, as infrastructure requirements become more complex, the development costs to procure, configure, and test cloud-based resources may increase, as the time and expertise needed to configure and test different respective network-based services in the provider network may increase. Automating interaction with cloud-based resources, for example, may require specialized knowledge and development capabilities. For those new systems or products utilizing automation of cloud-based resources, the specialized knowledge required may increase the development cost for implementing the automation, as well as future maintenance or extension activities.

Figure 1:
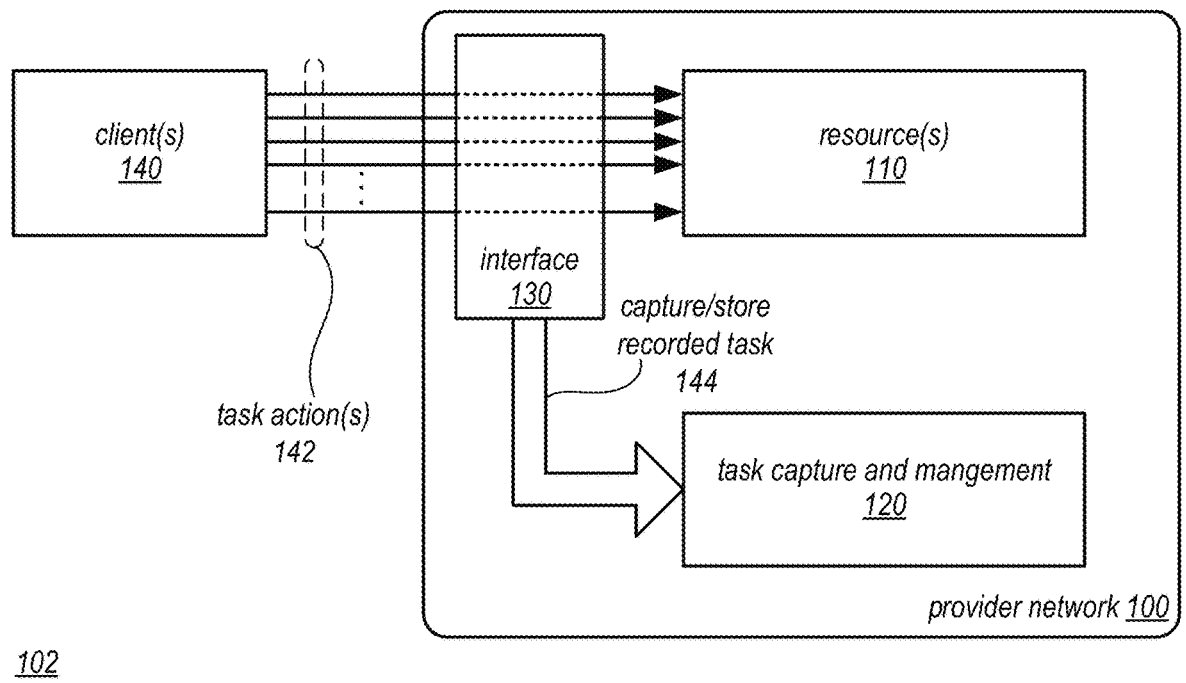
FIG. 1 is a series of logical data flow diagrams illustrating task capture and execution in a provider network, according to some embodiments.
Figure 1:
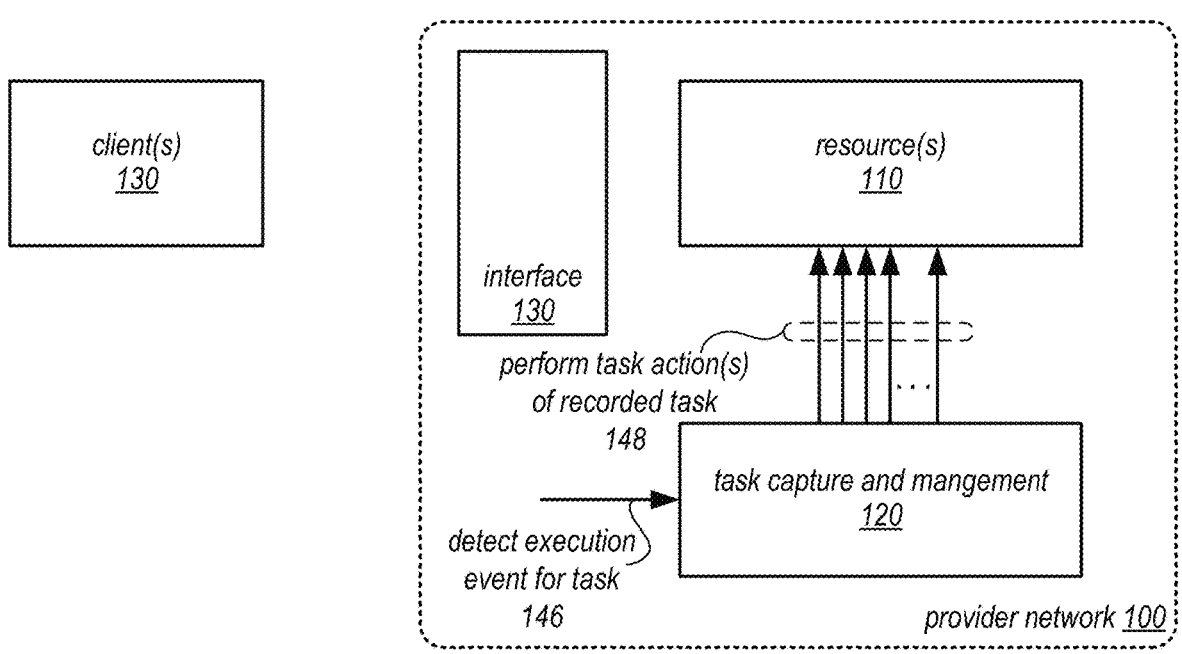

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement capture and execution of provider network tasks, according to some embodiments. A provider network may supply clients, operators, or other customers with access to and/or control of resources implemented by different network-based services that are implemented as part of the provider network. These resources may include various types of computing systems or devices configured for communication over a network that provide several different kinds of services, from computing or processing services, storage services, to database services or content delivery services. For example, in some embodiments, a provider network may include a virtual computing service that provides virtual computing resources to clients, users, or other type of customers, in the form of compute instances (e.g., a virtual machine acting as a distinct logical computing system that provides users with the illusion that they are the sole operators and administrators of a given hardware computing resource).

Clients of the provider network may reserve (i.e., purchase or buy) one or more resources (such as compute instances) to perform various functions, services, techniques, and/or applications. Various different configurations of the resources may be determined, arranged, or developed in order to implement these desired functions, services, techniques, and/or applications. For instance, one or more virtual compute instances may be configured using a particular machine image (e.g., a software stack) that has been developed to implement a particular application and placed within a particular virtual network resource configured to include the virtual compute instances. For functions, services, techniques and/or applications that perform multiple iterations of the same (or similar task) or perform specific tasks in response to specific scenarios, the automated performance of the appropriate task may be desirable.

Consider a scenario where an application operating in a provider network has failure tolerance model that utilizes at least three nodes performing a particular function at any given time in order to guarantee user information. If one or more of the minimum three nodes fails or becomes sufficiently overloaded, then a replacement node may have to be launched (or the failing node restarted) in order to continue to satisfy the tolerance model. A node failure occurs at an inconvenient time to launch the replacement node (e.g., late at night, during shift change, insufficient personal/resources) may cause data loss or other poor application performance. To launch the replacement node, an interface designed for manual input (e.g., a graphical user interface or command line interface) may be used.

Instead of relying upon manual intervention to perform various resource tasks (e.g., handle resource failure scenarios), provider networks may offer interfaces that allow client-side implementations of automation and resource management (e.g., programmatic interfaces, such as Application Programming Interfaces (APIs)). While these interfaces provide provider network customers with the opportunity to develop automation and management of provider network tasks which would otherwise be manually performed, the cost or burden of the development may prove challenging for some provider network customers. Smaller businesses, or other users with limited resources, may be unable to obtain access to the knowledge, experience, and/or expertise to implement customized automation utilizing these interfaces. Moreover, as the number of network-based services and platforms continues to grow, customers with even greater resources and/or development capabilities may be unable to keep pace with the increasing amount of interfaces and technology for provider network resources. The amount of time to develop an automated solution may also prove a limiting factor, as it may take time for even experienced developers to familiarize themselves with a new system and interface. Customers faced with these scenarios may utilize manual input interfaces in order to get tasks accomplished.

In various embodiments, capture and management of provider network tasks performed via manual interfaces, such as those described above may allow provider network customers to reap the benefits of automation without bearing the same costs or burdens to create automated solutions. FIG. 1 is a series of logical data flow diagrams illustrating task capture and execution in a provider network, according to some embodiments. In scene 102, provider network 100 may implement various resources, such as resource(s) 110 that are available to clients, such as client 140, to utilize for implementing various functions, services, systems, and/or applications. As part of utilizing resource(s) 110, client(s) 140 may perform different tasks with respect to resource(s) 110. For example, a resource 110 may be a virtual compute node or instance, such as described above, which may be configured to access another resource (e.g., a storage volume).

Client(s) 140 may perform one or more task action(s) 142 (e.g., to configure the virtual compute node to access the storage volume). Such task action(s) may be communicated via an interface for the provider network, such as interface 130, which may be a manual interface. Task inputs, such as client 140 actions (e.g., mouse clicks, text input, key strokes, audible commands, or other interactions) with respect to user interface elements in a graphical user interface implemented as part of interface 130, for instance, may be evaluated to determine task actions 142 (e.g., determining which setting buttons, for example, were set on a configuration page for a resource 110). In at least some embodiments, the task inputs may be provided as part of an interface 130 guided wizard, workflow, or pre-determined sequence of interface actions. Based, at least in part, on the task inputs, the task actions may be capture and stored 144 as part of a task capture and management 120 module, system, service, or device.

The recorded task may be made available for subsequent execution. As illustrated in scene 104, an execution event for the recorded task may be detected 146 at task capture and management 120. For example, a condition, threshold, or criteria may be determined or satisfied, or a notification or indication may be received that triggers the execution event for the recorded task. The execution event for a recorded task may be defined and incorporated into a task rule set, in some embodiments, which may be used to perform the recorded task. In response to detecting the execution event, task capture and management 120 may execute the recorded task, performing the task actions of the recorded task 148. Executing recorded tasks may allow client 140 to implement automation for recorded tasks performed with respect to resource(s) 110, so that manual performance is not required. Thus highly repetitive tasks, or tasks that are to be performed in particular scenarios may be automated at provider network 100 as triggered by execution events.

Recorded tasks may be configurable in many ways. For example, different task parameters may be defined and included in a task rule set for the recorded task, in some embodiments. Consider the example scenario described above, where a storage volume is attached to a virtual compute node. The task parameters for the task actions to perform may include an identity of the virtual compute node and an identity of the storage volume. Task parameters may be generalized, acting as a template for a specific task parameter value which may be received as input from another task, client input, determined from a task rule set, detected execution event or other source. The execution event, for instance, may indicate that the virtual compute node needs to access the particular storage volume. Thus, the execution event may identify the virtual compute node in the above example (i.e., the one that needs to access the storage volume), as well as the storage volume to be accessed. Some task parameters may have static or constant values. The same recorded task may be executed for instance to connect a different virtual compute instance to the same storage volume. Alternatively, task parameters may be defined so that the value for a task parameter is identifiable at least at the time of execution of the recorded task (e.g., identify the source of the parameter value, or actions needed to obtain the value). In this way, the same task actions may be repeated each time a recorded task is executed, but the task parameters may adjust the performance of task actions, and thus the performance of the same recorded task may vary.

In addition to capturing recorded tasks for client 140, other recoded tasks may be obtained. In some embodiments, other clients of provider network 100 may publish, share, or otherwise make accessible other recorded tasks captured for task actions performed as part of the other recorded tasks. Tasks recorded for other provider networks may be uploaded, and a translated version of the task may be generated to execute the task with respect to resources for the provider network. Recorded tasks may also be combined into recorded task workflows, such as discussed below with regard to FIGS. 3 and 9, which may execute multiple recorded tasks according to a workflow rule set, in some embodiments.

Please note that previous descriptions are not intended to be limiting, but are merely provided as a logical example of a provider network, resources, task capture and management, and a client. Various other components may interact with or assist in implementing a capture and management of provider network tasks. For example, the number of task actions or resources may differ. In at least some embodiments, task inputs received during the capture of a task may not actually affect/reach resources, until performed as part of a recorded task in response to an execution event.

This specification next includes a general description of a provider network, which may implement a task capture and management service to provide task capture and execution for tasks performed with respect to resources in the provider network. Various examples of a provider network, task capture and management service, other network-based services or resources, and clients are discussed, including different components/modules, or arrangements of components/module that may be employed as part of a task capture and management service. A number of different methods and techniques to implement capture and execution of provider network tasks are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
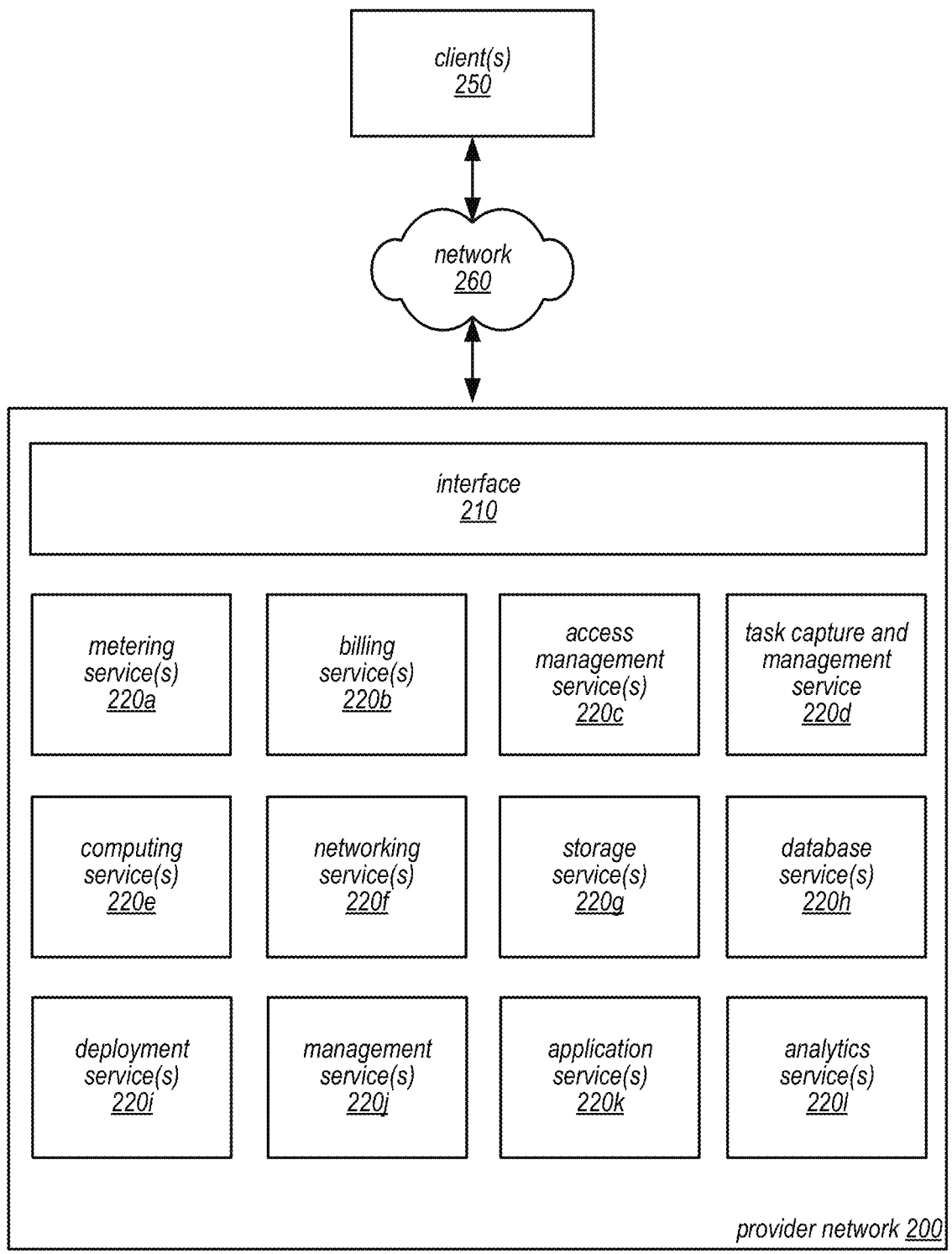
FIG. 2 is block diagram illustrating a provider network that implements multiple different network-based services for clients, including a task management and capture service, according to some embodiments.

FIG. 2 is block diagram illustrating a provider network that implements multiple different network-based services for clients, including a task management and capture service, according to some embodiments. Provider network 200 may be set up by an entity such as a company or a public sector organization to provide one or more network-based services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like, needed to implement and distribute the infrastructure and services offered by the provider network 200. Clients 250 may be configured to access via network 260 network-based services implemented as part of provider network 200 to perform various tasks, implement various systems, functions, or applications.

Provider network 200 may implement many different kinds of services, and thus the following discussion of various services is not intended to be limiting. For example, various network-based services may be implemented such as deployment service(s) 220*i*, management service(s) 220*j*, application service(s) 220*k*, and analytic service(s) 220*l*, or other services not illustrated such as various messaging or diagnostic services. In some embodiments, provider network 200 may implement storage service(s) 220*g*. Storage service(s) 220*g* may be one or more different types of services that provide different types of storage. For example, storage service(s) 220*g* may be an object or key-value data store that provides highly durable storage for large amounts of data organized as data objects. In some embodiments, storage service(s) 220*g* may include an archive long-term storage solution that is highly-durable, yet not easily accessible, in order to provide low-cost storage. In some embodiments, storage service(s) 220*g* may provide virtual block storage for other computing devices, such as compute instances implemented as part of virtual computing service 240. For example, a virtual block-based storage service 220*g* may provide block level storage for storing one or more data volumes mapped to particular clients, providing virtual block-based storage (e.g., hard disk storage or other persistent storage) as a contiguous set of logical blocks. Storage service(s) 220*g* may replicate stored data across multiple different locations, fault tolerant or availability zones, or nodes in order to provide redundancy for durability and availability for access.

In some embodiments, provider network 200 may implement database service(s) 220*h*. Database services 220*h* may include many different types of databases and/or database schemes. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

Provider network 200 may implement networking service(s) 220*f* in some embodiments. Networking service(s) 220*f* may configure or provide virtual networks, such as virtual private networks (VPNs), among resources implemented in provider network 200 as well as control access with external systems or devices. For example, networking service(s) 220*f* may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured.

Networking service(s) 220*f* may manage or configure the internal network for provider network 200 (and thus may be configured for implementing various resources for a client 250). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 250 may be attached to the overlay network so that when a client 250 provides an IP address that they want to send packets to, the IP address is run in virtual space by communicating with a mapping service (or other component or service not illustrated) that knows where the IP overlay addresses are.

In some embodiments, provider network 200 may implement virtual computing service 220*e*, to provide computing resources. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 250 applications, without for example requiring the client 250 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may implement components to coordinate the metering and accounting of client usage of network-based services, including network-based services 220e-220l, such as by tracking the identities of requesting clients, the number and/or frequency of client requests, the size of data stored or retrieved on behalf of clients, overall storage bandwidth used by clients, class of storage requested by clients, or any other measurable client usage parameter. Provider network 200 may also implement financial accounting and billing service(s) 220b, or may maintain a database of usage data that may be queried and processed by external systems for reporting and billing of client usage activity. In certain embodiments, provider network 200 may implement components (e.g., metering service(s) 220a) that may be configured to collect, monitor and/or aggregate a variety of service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients to enable such clients to monitor their usage of network-based services.

In some embodiments, provider network 200 may implement components to implement user authentication and access control procedures, such as access management service(s) 220c, for provider network 200 resources. For example, for a given network-based services request to access a particular compute instance, provider network 200 may implement components configured to ascertain whether the client associated with the access is authorized to configured or perform the requested task. Authorization may be determined such by, for example, evaluating an identity, password or other credential against credentials associated with the resources, or evaluating the requested access to the provider network 200 resource against an access control list for the particular resource. For example, if a client does not have sufficient credentials to access the resource, the request may be rejected, for example by returning a response to the requesting client indicating an error condition. In at least some embodiments, task capture and management service 220d, discussed in more detail below with regard to FIGS. 3-9, may provide for the capture, management, and execution of tasks performed with regard to resources implemented at different network-based services in provider network 200.

Network-based services implemented as part of provider network 200 may each implement respective programmatic interfaces, in some embodiments. For example, requests directed to virtual computing service 220e may be formatted according to an API for virtual computing service 220e, while requests to storage service(s) 220g may be formatted according to an API for storage service(s) 220g. Different portions of the various APIs may be exposed to external clients, in some embodiments, with some other portions remaining available to internal clients, such as other network-based services in provider network 200. Provider network 200 may also implement interface 210. Interface 210 may be a programmatic interface and/or a graphical user interface (e.g., hosted on a network-based site for the provider network). Interface 210 may facilitate the input for manual performance of various tasks, which may be captured, stored, and subsequently executed in response to the detection of execution events for the recorded tasks. For example, interface 210 may provide different configuration or control panels, launch/configuration wizards, or any other form of interface to manually perform tasks with respect to resources implemented at provider network 200, whether implemented using graphical user interface elements or command-line or other manual input components.

Clients 250 may encompass any type of client configurable to submit requests to network-based services platform 200, in various embodiments. For example, a given client 250 may include a suitable version of a web browser, or may include a plug-in module or other type of code module configured to execute as an extension to or within an execution environment provided by a web browser. In some embodiments, clients 250 may include sufficient support to send the requests according to various programmatic interfaces for the service, as well as other supported protocols at the resources (e.g., Hypertext Transfer Protocol (HTTP)) for generating and processing network-based service requests without necessarily implementing full browser support. In some embodiments, clients 250 may be configured to generate network-based services requests according to a Representational State Transfer (REST)-style network-based services architecture, a document- or message-based network-based services architecture, or another suitable network-based services architecture. In some embodiments, a client 250 (e.g., a computational client) may be configured to provide access to network-based resource in a manner that is transparent to applications implemented on the client 250 utilizing the provider network resource.

Clients 250 may convey network-based services requests to provider network 200 via network 260. In various embodiments, network 260 may encompass any suitable combination of networking hardware and protocols necessary to establish network-based communications between clients 250 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network. It is noted that in some embodiments, clients 250 may communicate with network-based service using a private network rather than the public Internet.

Figure 3:
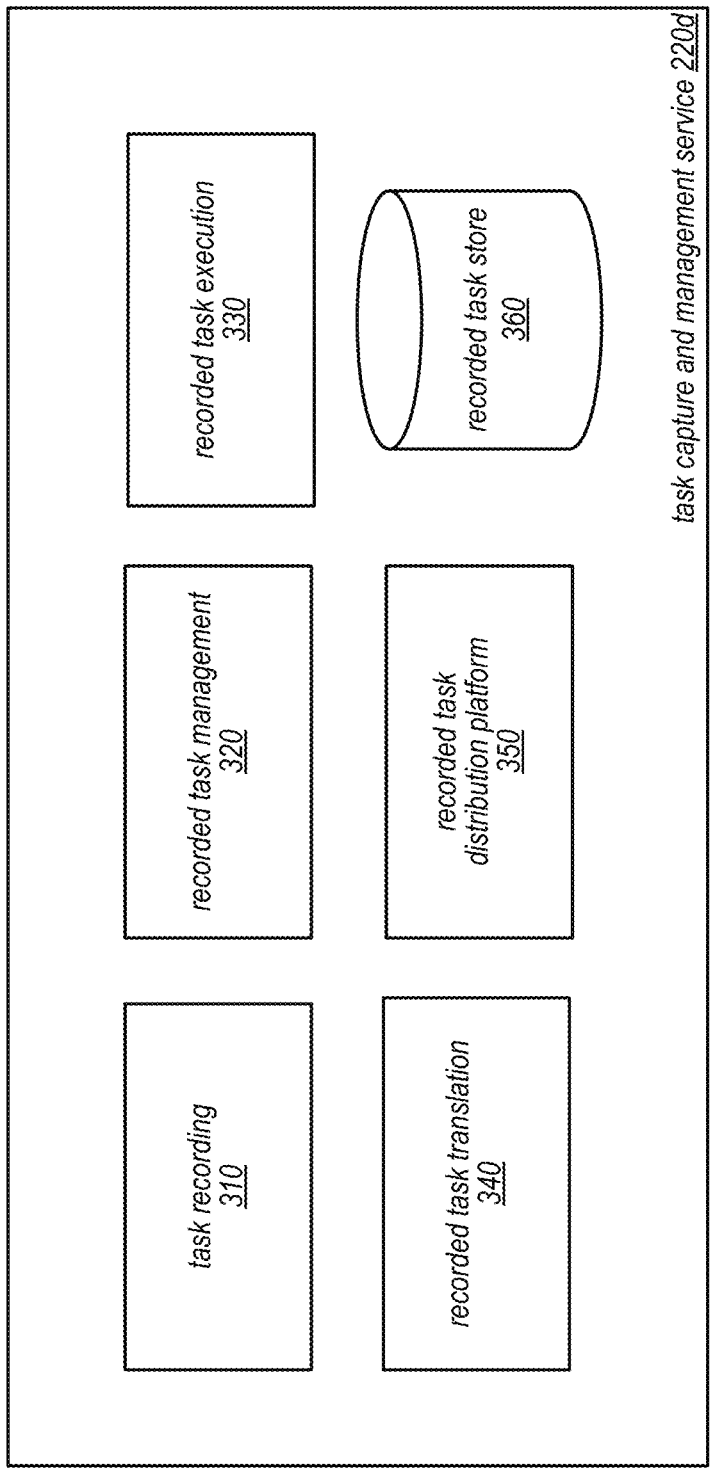
FIG. 3 is a block diagram illustrating a task capture and management service, according to some embodiments.

FIG. 3 is a block diagram illustrating a task capture and management service, according to some embodiments. Task capture and management service 220 may implement various systems, components, and/or devices, such as computing system 2000 described below in FIG. 14, to capture or record task actions, generate and store recorded tasks, modify, configure, or remove recorded tasks, combine multiple recorded tasks into recorded task workflow, execute recorded tasks or recorded task workflows, distribute recorded tasks for one client to other clients, translate recorded tasks for other provider networks, and/or any other recorded task related functions. For example, in various embodiments, task capture and management service 220d may implement task recording 310.

Figure 10:
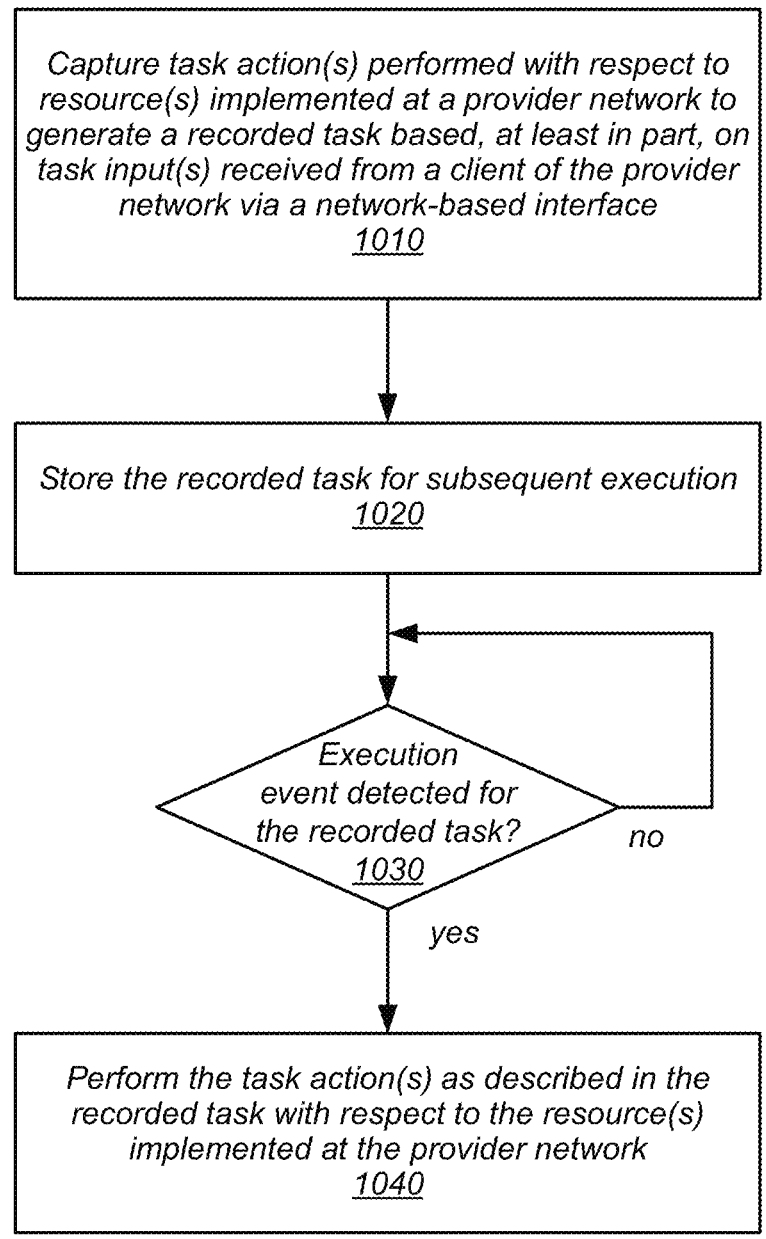
FIG. 10 is high-level flowchart illustrating various methods and techniques for providing task capture and execution, according to some embodiments.
Figure 11:
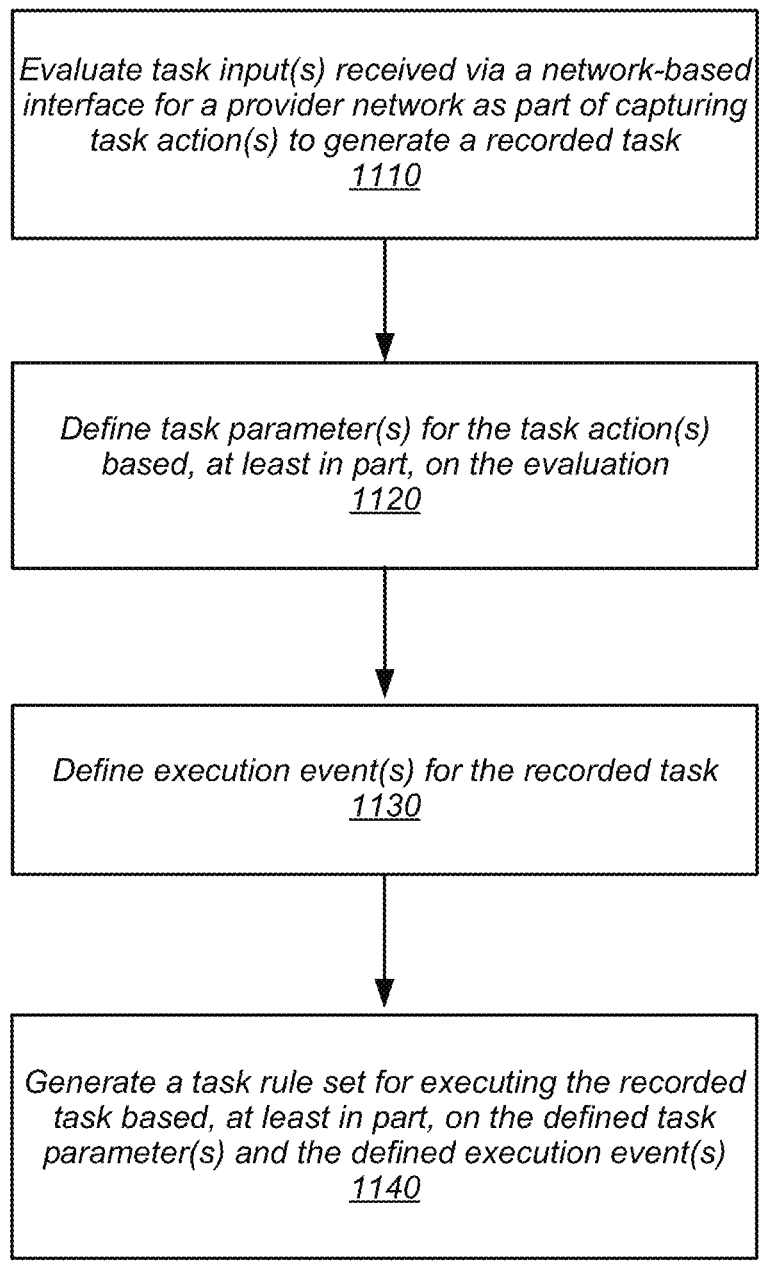
FIG. 11 is a high-level flowchart illustrating various methods and techniques for capturing a task, according to some embodiments.

Task recording 310 may be configured to capture or record task actions performed with respect to resources in a provider network, and thus may perform the different techniques discussed below with regard to FIGS. 10 and 11. Task recording 310 may, for instance, receive inputs from an interface, such as interface 210, to initiate the recording of task actions. Task recording 310 may evaluate task inputs (e.g., actions performed with respect to user interface elements or text commands received as part of a command line interface) to determine task actions to be captured, such as discussed in further detail below with regard to FIGS. 4-5D. Task recording 310 may also be configured to define task parameters (e.g., variables) for the performance of task actions. Task recording 310 may define the execution event(s) which trigger the performance of a recorded task, in some embodiments. Task recording 310 may generate task rule sets based on the defined task parameters and/or execution events, which may be stored or recorded along with captured task actions.

In some embodiments, task capture and management service 220d may implement recorded task management 320. Recorded task management 320 may be configured to handle requests to change the performance of recorded tasks. For instance, a request to change how a particular task action is performed, how a particular task parameter is defined, or how an execution event is defined, such as discussed below with regard to FIG. 6. Task rule sets stored in recorded task store 360 may be accessed, for example, to update particular task rule sets for changes to a corresponding recorded task. New task actions, task parameters, or execution events may be added to a task, in some embodiments. Task actions, task parameters, or execution events may also be removed from a task. Recorded task management 320 may also implement management functions for multiple recorded tasks linked together to form recorded task workflows, such as discussed below with regard to FIG. 9. Recorded task management 310 may, in some embodiments, modify or edit a recorded task workflow rule set to implement changes to the execution of a recorded task workflow. Recorded task management 320 may also provide source code versions of recorded tasks to clients, in some embodiments.

In some embodiments, task capture and management service 220d may implement recorded task execution 330 to detect execution events for recorded tasks and/or recorded task workflows, and perform the described task actions for the recorded tasks and/or recorded task workflows. For instance, recorded task execution 310 may register with a monitoring, notification, or other network-based service or system of a provider network (or may implement monitoring) to obtain information to evaluate execution event definitions. Consider the scenario where an execution event is defined based on a utilization threshold for some resource (e.g., compute instance processing, virtual storage size or throughput, etc.). A monitoring service, or component of an implementing service for a resource, may provide information about the utilization of that resource to recorded task execution 330, which may then evaluate one (or more) execution event rules pertaining to the received information. Similarly, recorded task execution 330 may implement respective monitoring components to collect or obtain information necessary to evaluate definitions of execution events for recorded tasks.

Recorded task execution 330 may be configured to parse, compile, translate, or otherwise make executable the recorded tasks for execution. For example, in various embodiments, recorded task execution 330 may be configured to generate various API commands and send them to respective network-based services to perform the described task actions in a recorded task. As discussed below with regards to FIGS. 10 and 12, recorded task execution 330 may be configured to evaluate recorded task rule sets (and similarly recorded task workflow rule sets) to utilize task parameter definitions (e.g., populate various fields in the generated API commands based on task parameter definitions) to identify task parameter values, in some embodiments. The task parameter values identified may be statically defined parameter values, or may be dynamically determined, in some embodiments, when the recorded task is executed.

Task capture and management service 220d may, in some embodiments, implement recorded task translation 340. Recorded task translation 340 may be configured to perform the various techniques described below with regard to FIGS. 7 and 13. For example, recorded task translation 340 may receive a recorded task file and access a particular translation engine configured to decode a recorded task for particular provider network and to generate a translated version which recorded task execution 330 may execute.

In at least some embodiments, task capture and management service may implement recorded task distribution platform 350. Recorded task distribution platform 350 may provide a platform to share recorded tasks from one client so that other clients may obtain and execute of the shared recorded task. Clients may record a task and publish it to recorded task distribution platform 350, which may provide an interface, such as discussed below with regard to FIG. 8, that other clients may utilize to search for published recorded tasks, in some embodiments. Recorded task distribution platform 350 may generate search indexes, and other cataloging techniques, to identify and provide recorded task results, in some embodiments.

In various embodiments, task capture and management service 220d may implement recorded task store 360 in order to store recorded tasks (e.g., task actions and task rule sets, and recorded task workflow rule sets). Task actions and/or task rule sets may be stored in various formats, such as source code, executable files, entries in a database table, or specially structured configuration files or descriptions files. Recorded task store 360 may be structured or configured to efficiently store and provide access to the task actions and/or task rule sets, in some embodiments. For instance, a log-structured data store may be implemented to store recorded tasks as logs of task actions.

In at least some embodiments, task actions for recorded tasks may be captured and stored independent of particular user interface for the provider network. For instance, user interface designs may change (e.g., text input boxes may become drop down menus, buttons may become checkboxes, elements displayed in one page may be moved to another, etc.), which could render recorded tasks that merely replay user inputs obsolete. However, in some embodiments, task actions of a recorded task may correspond to back-end interface actions, which may be more stable and less likely to be affected by changes to a user interface. Thus, in at least some embodiments, performing task actions for a recorded task may be performed without replaying task inputs from a client to a user interface.

Figure 4:
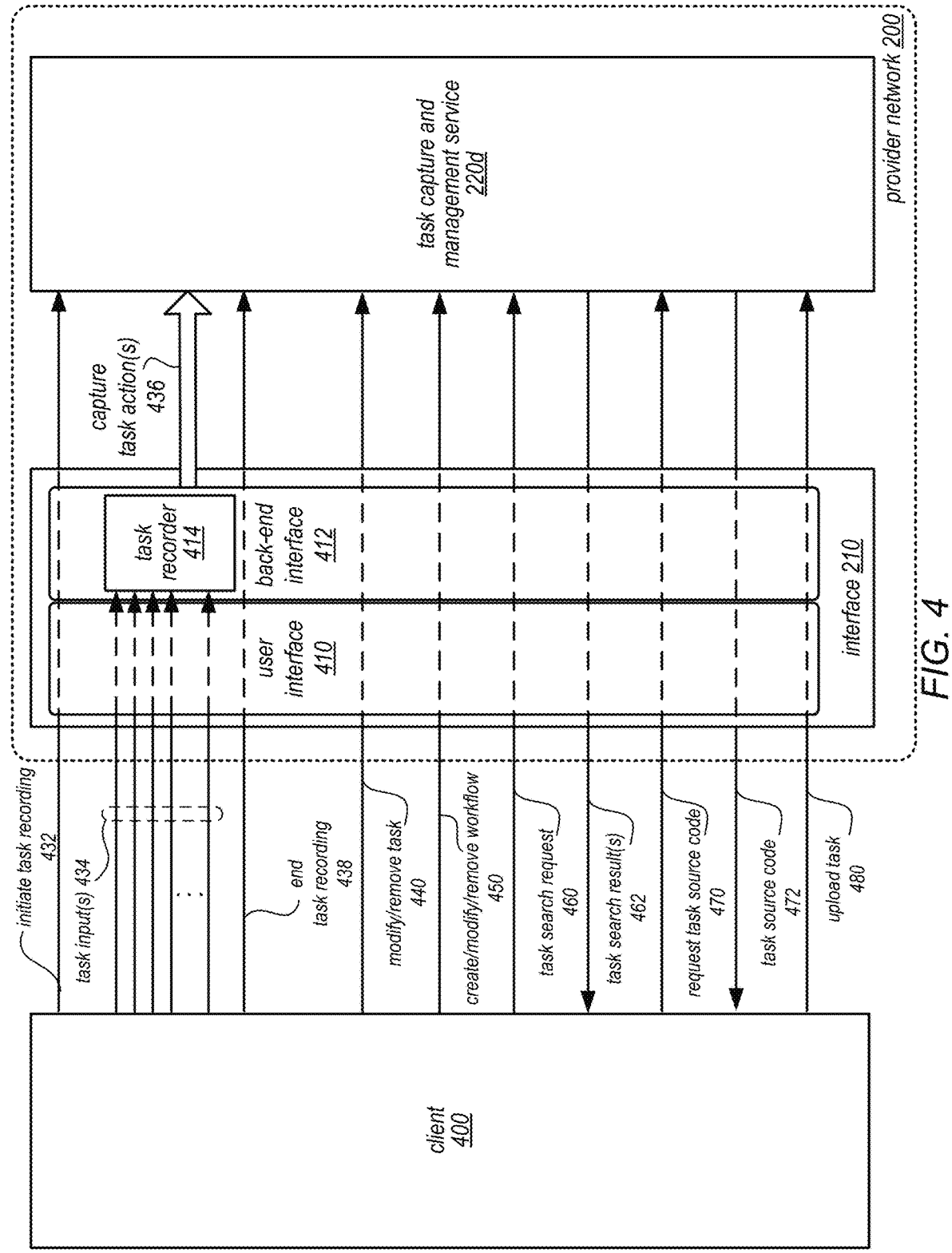
FIG. 4 is a diagram illustrating interactions among a client, provider network interface, and task capture and management service, according to some embodiments.

FIG. 4 is a diagram illustrating interactions among a client, provider network interface, and task capture and management service, according to some embodiments. Client 400 may initiate task recording 432 via interface 210 at task capture and management service 220d. As illustrated in FIG. 4, interface 210 may comprise multiple layers, such as user interface layer 410 (e.g., a graphical user interface and/or a command line interface) for task input and back-end interface 412 which may be configured to interpret into task actions that may be performed with respect to resources in provider network 402 (e.g., translate user interface actions into API calls for one or more network-based services implementing resources involved in the task being recorded). Thus, in some embodiments back-end interface 412 may implement a task recorder 414, which may capture the information specific to a currently recording task. For instance, task input(s) 434 a received via user interface 410 into task recorded 414. Task recorded 414 may obtain the translated task actions from back-end interface 412 and insert/include other information to perform the recorded task as part of capturing task action(s) 436. For example, task recorder may generate task parameter definitions, task rule sets, and/or execution events for recording tasks and include the generated information along with task action, such as API calls, to be sent to task capture and management service for storage. In this way, even if user interface 410 is changed, captured task action(s) 436 may still be executable at provider network 200 to perform a recorded task. Client 400 may send an end task recording request 438 to finish recording the task.

Further interactions between client 400 and task capture and management service may include requests to modify or remove recorded tasks 440, as discussed below with regard to FIG. 6. Instead of re-recording a whole new task to change one particular action in a recorded task, the individual task action (or task parameter, execution event, task rule set, etc.) may be changed. Client 400 may send requests to create, modify, or remove recorded task workflows 450, as discussed below with regard to FIG. 9. For instance, it may be desirable to add an additional recorded task to a recorded task workflow. Client 400 may send task search requests 460 to task capture and management service 220d, such as discussed below with regard to FIG. 8. Specific search criteria, for instance type of resources or type of actions performed may be included, in some embodiments. Task capture and management service 220d may identify candidate recorded tasks shared or published by other clients and return task search result(s) 462. In some embodiments, client 400 may request recorded task source code 470 from task capture and management service 220d. Task capture and management service 220d may generate and/or provide a version of a recorded task in source code 472 to client 400. In some embodiments, client 400 may upload 480 a previously recorded task at another provider network, as discussed below with regard to FIG. 7.

Figure 5A:
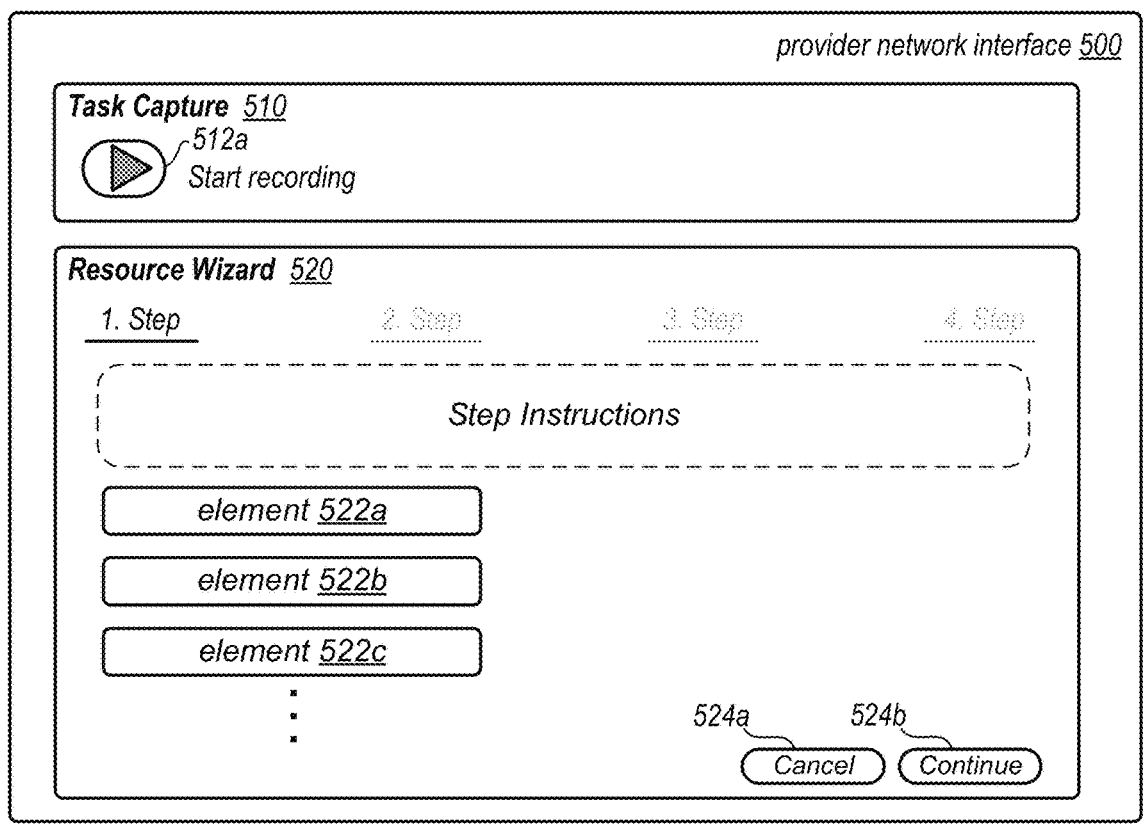
FIGS. 5A through 5D are example illustrations of graphical user interfaces for capturing tasks in a provider network, according to some embodiments.

FIGS. 5A through 5D are example illustrations of graphical user interfaces for capturing tasks in a provider network, according to some embodiments. In FIG. 5A, provider network interface 500 may be a graphical user interface via which clients of a provider network can perform various tasks with respect to different resources implemented at a provider network. For example, resource wizard 520 allows a client to provide input for a series of elements 522, such as elements 522a, 522b, and 522c, which may be different buttons, dials, sliders, check boxes, text input, upload input, menus, or any other user interface elements for multiple steps (e.g., steps 1-4). The resource wizard 520 may be cancelled by selecting cancel element 524a or continued, selecting continue element 524b. Please note that although a wizard menu is discussed with regard to FIGS. 5A-5D, many other different types of user interfaces (including command line interfaces) may be implemented and recorded, and thus the instant example of a resource wizard is not intended to be limiting.

Figure 5B:
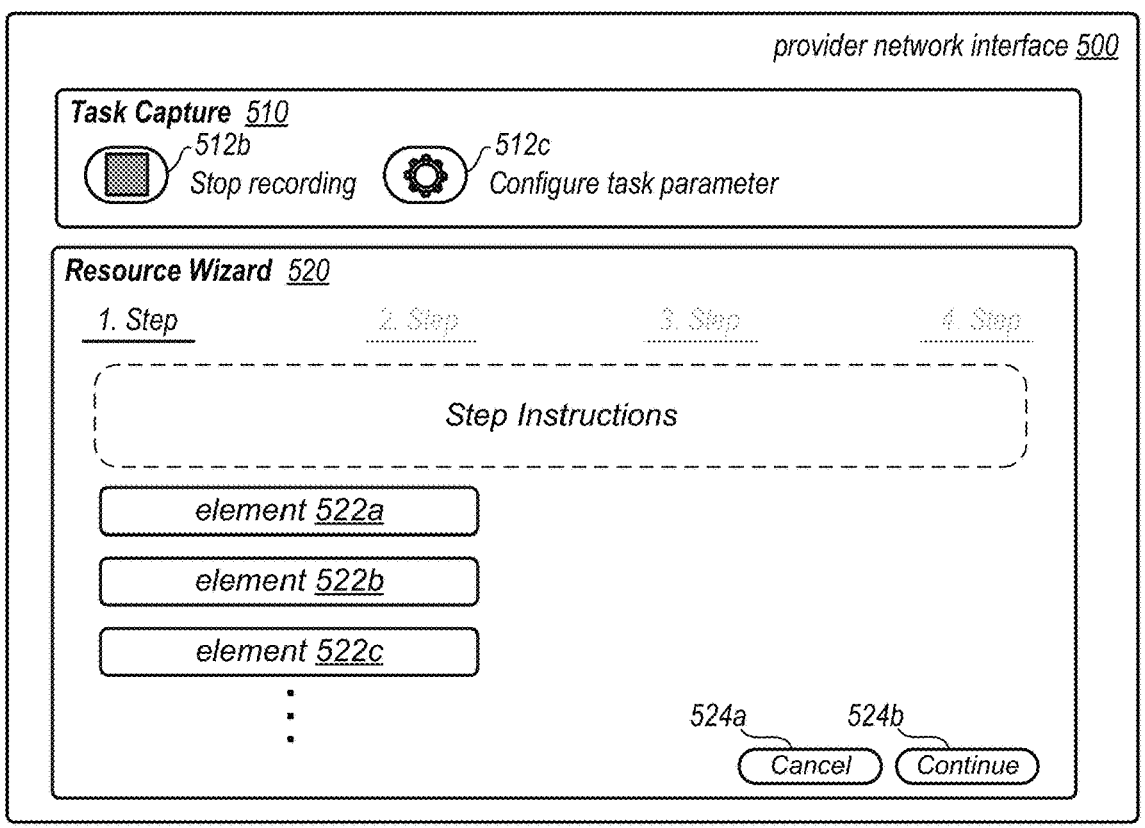

Provider network interface 500 may implement a task capture element 510, in some embodiments. For example, as illustrated in FIG. 5A, task capture element 510 may implement a user interface element 512a to start recording. Selection of element 512 may record task inputs with respect to element(s) 522 (e.g., clicks, selections, text input, key strokes, etc.). As illustrated in FIG. 5B, once task recording begins new user interface elements may be implemented, such as stop recording element 512b and configure task parameter element 512c. Selection of configure task parameter 512c may allow a client to identify a task parameter for an element 522. For instance, parameters for task elements 522 may be statically defined by the parameter value input during the recording of the task. However, selecting configure task parameter 512c, may allow a client to designate certain task parameters to have dynamically determined parameter values (e.g., receiving input from another task, from task rule set, parameter template, database, etc.), which may differ from one performance of the recorded task to another.

Figure 5C:
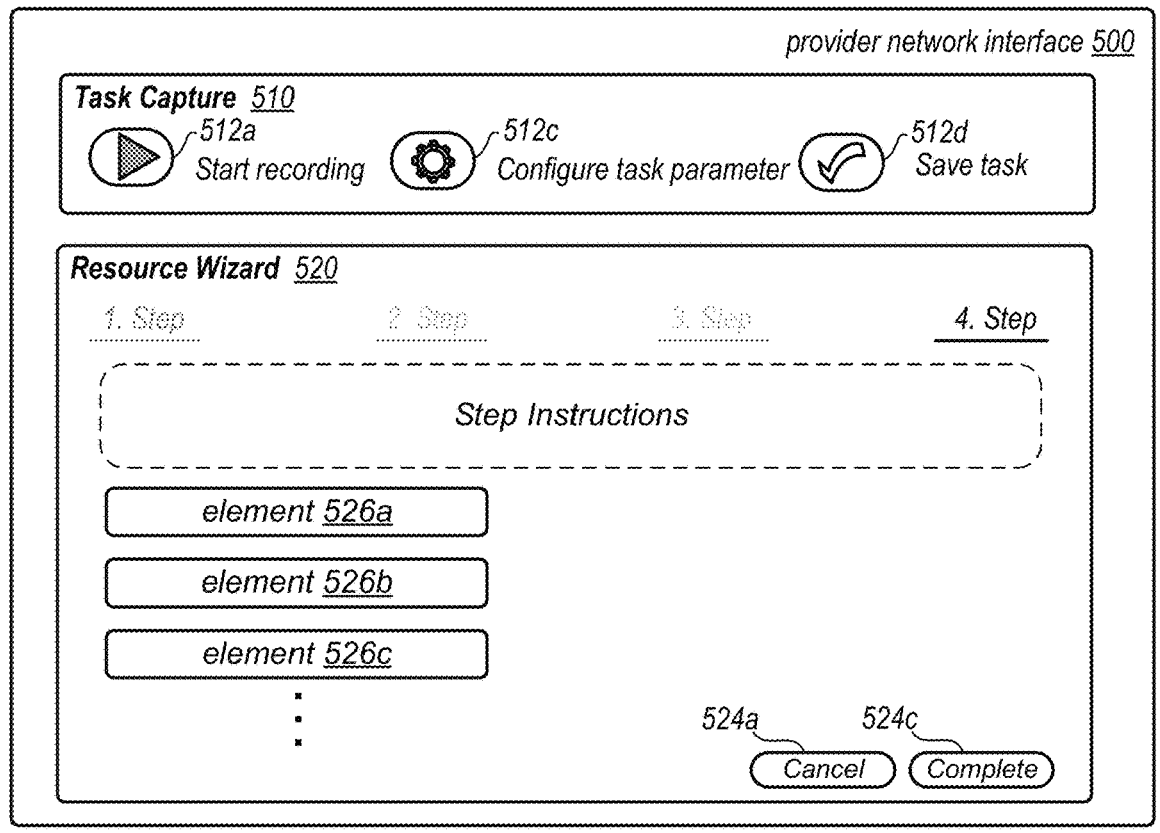
Figure 5D:
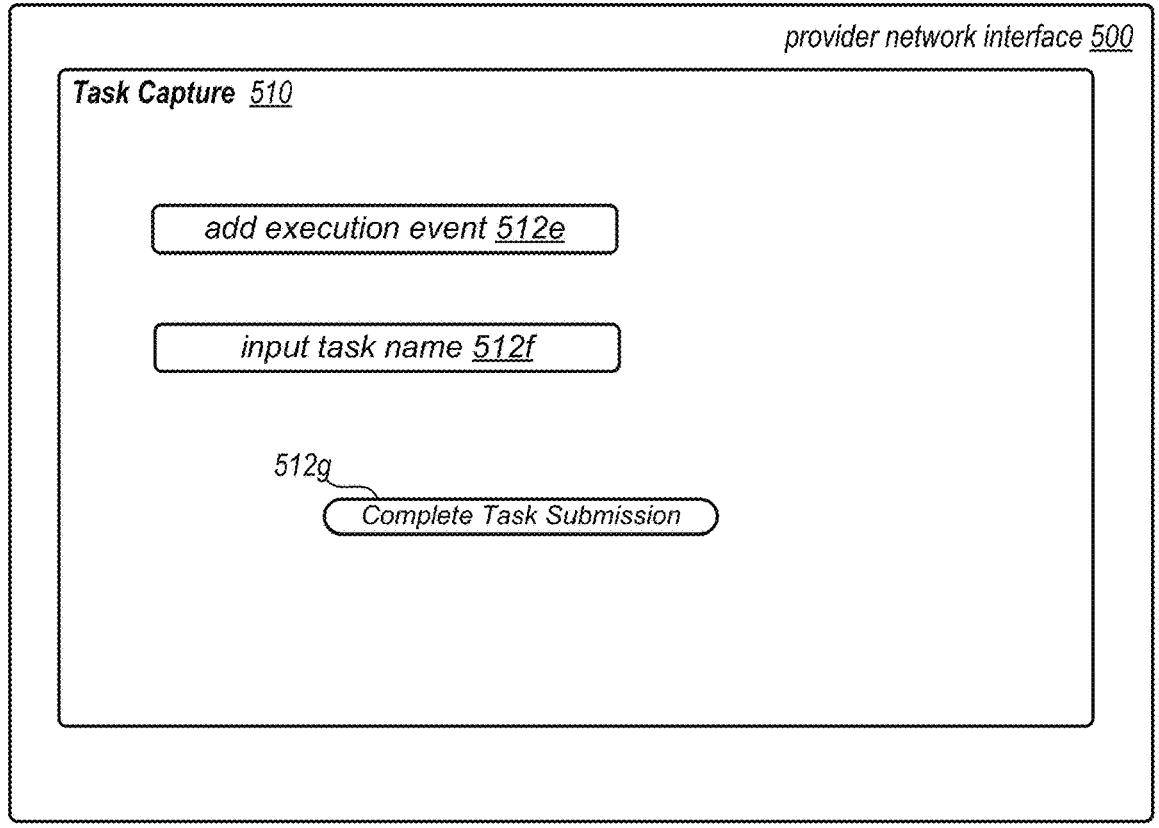

Selection of stop recording element 512b may stop recording task inputs for the capture of task actions, in some embodiments. As illustrated in FIG. 5C, task capture element 510 may retain configure task parameter element 512c, which may allow a client to configure task parameters even though active recording is no longer being performed. Task capture element 510 may redisplay start recording element 510a, allowing a client to continue recording. Task capture element 510 may implement save task element 512d. Selection of save task element 512c, may trigger a recorded task finalization process. For example, as illustrated in FIG. 5D, task capture element may be expanded (or a pop-up window or other interface element generated) to prompt a client to add a task execution event, such as element 512e. Adding a task execution event may trigger a text input, window, list of pre-defined scenarios, thresholds, or other indications which may be used to trigger an execution event for the recorded task. Multiple different execution events may be added for a same recorded task (e.g., increase resource throughput when utilization exceeds threshold 1, and increase resource throughput when utilization exceeds threshold 2). Task capture element 510 may also implement an element 512f to receive input for a task name to be given to the recorded task (e.g., a text input element). Selection of complete task submission element 512g may trigger finalization and storage of the captured task actions (and may include a task rule set).

Once tasks are recorded and stored, different operations to manage or modify the execution of recorded tasks may be implemented. FIG. 6 is an example illustration of a graphical user interface for managing recorded tasks in a provider network, according to some embodiments. Provider network interface 500 may implement a recorded task search 610 or discovery interface element to display or identify recorded tasks associated with a particular client or customer account of a provider network. For example, a search request may be entered for tasks with particular characters in their respective task name. Alternatively, a lookup may be performed based on task ID (which may be a globally unique identifier used by task capture and management service to distinguish between tasks for multiple different customer accounts).

Provider network may implement my recorded tasks element 620, which may display the searched for tasks or all recorded tasks for the particular customer account (or client). Various information about the recorded tasks, such as task ID, task name, and whether or not execution for the task is enabled, may be displayed. As illustrated in FIG. 6, task selection elements 622, such as task selection element 622a for task configure_storage_1, task selection element 622b for task configure_connection_1, task selection element 622c for task launch_instance_1, and task selection element 622d for task launch_instance_2. Selection of a task selection element 622 may provide a more detailed set of information about the selected task and additional task management options. For example, as illustrated in FIG. 6, task element 622c is selected. The various task actions performed as part of the recorded task launch_instance_1 may be displayed. Interface elements to modify actions, such as elements 624a, 624b, and 624c may be displayed. Selection of an element to modify an action, such as element 624a to modify action 1, may allow a user/client to change how the action is performed (or remove the action). For example, selecting element 624a may allow a client to change a task parameter from statically defined to dynamically defined. In some embodiments, selecting modify elements 624 may trigger the display of the same user interface (e.g., resource wizard element 620) which corresponds to the action allowing the client to modify the action by changing inputs to the user interface.

Figure 9:
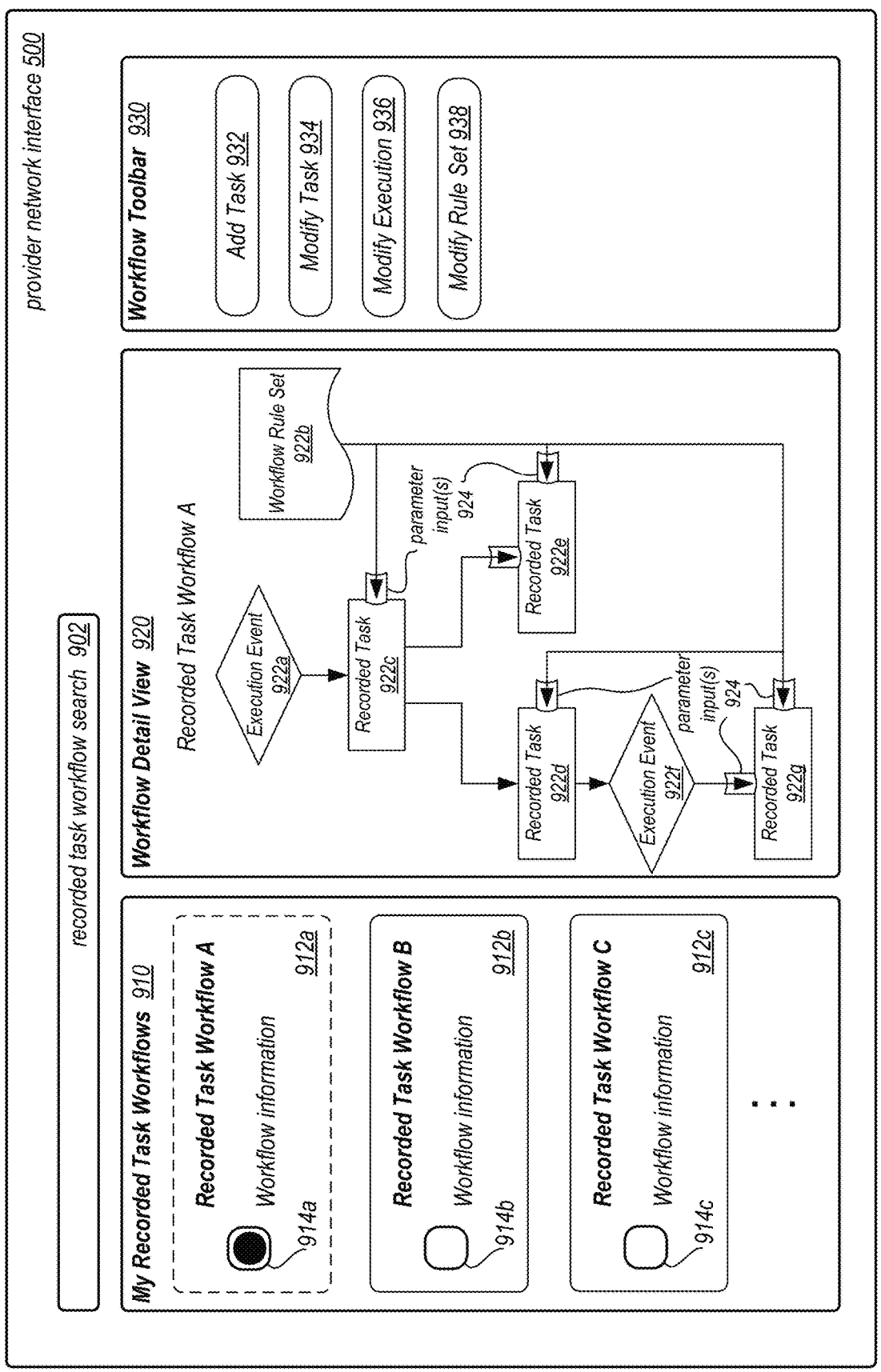
FIG. 9 is an example illustration of a graphical user interface for managing a recorded task workflow, according to some embodiments.

Other management actions for a particular task may be implemented. In some embodiments, an element 632 to delete or remove the recorded task may be implemented. A configured execution element 634 may allow clients to change, add, or remove execution events for the recorded task. In at least some embodiments, changing execution may trigger a recorded task workflow management interface to be displayed, such as illustrated in FIG. 9 below. An element 636 may allow a source code version of the recorded task to be downloaded (e.g., in a particular language and/or format) upon selection. Selection of share recorded task element 638 may publish the recorded task to a recorded task distribution platform, such as discussed above with regard to FIG. 3, allowing other clients to execute the recorded task.

Figure 6:
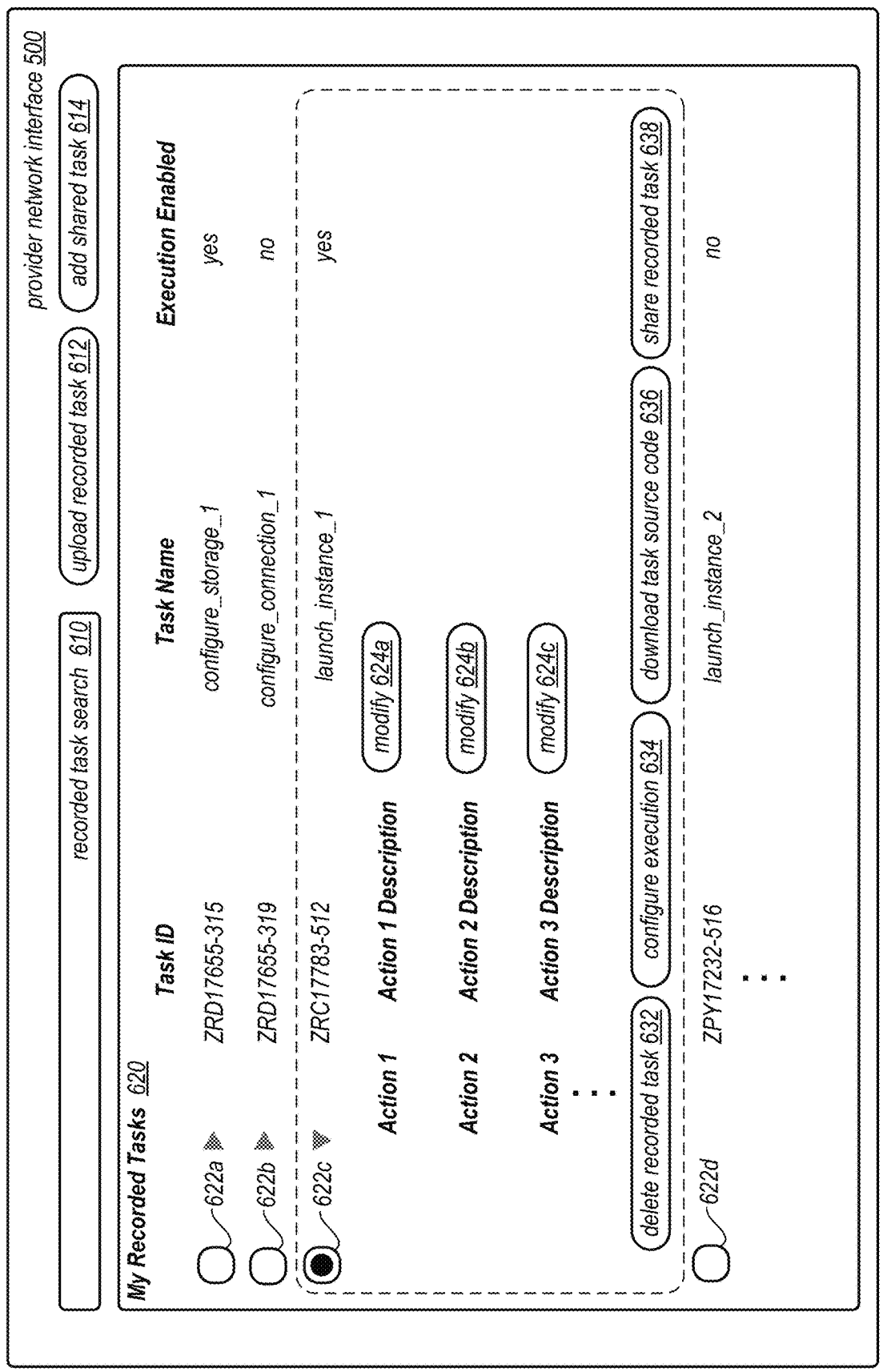
FIG. 6 is an example illustration of a graphical user interface for managing recorded tasks in a provider network, according to some embodiments.
Figure 7:
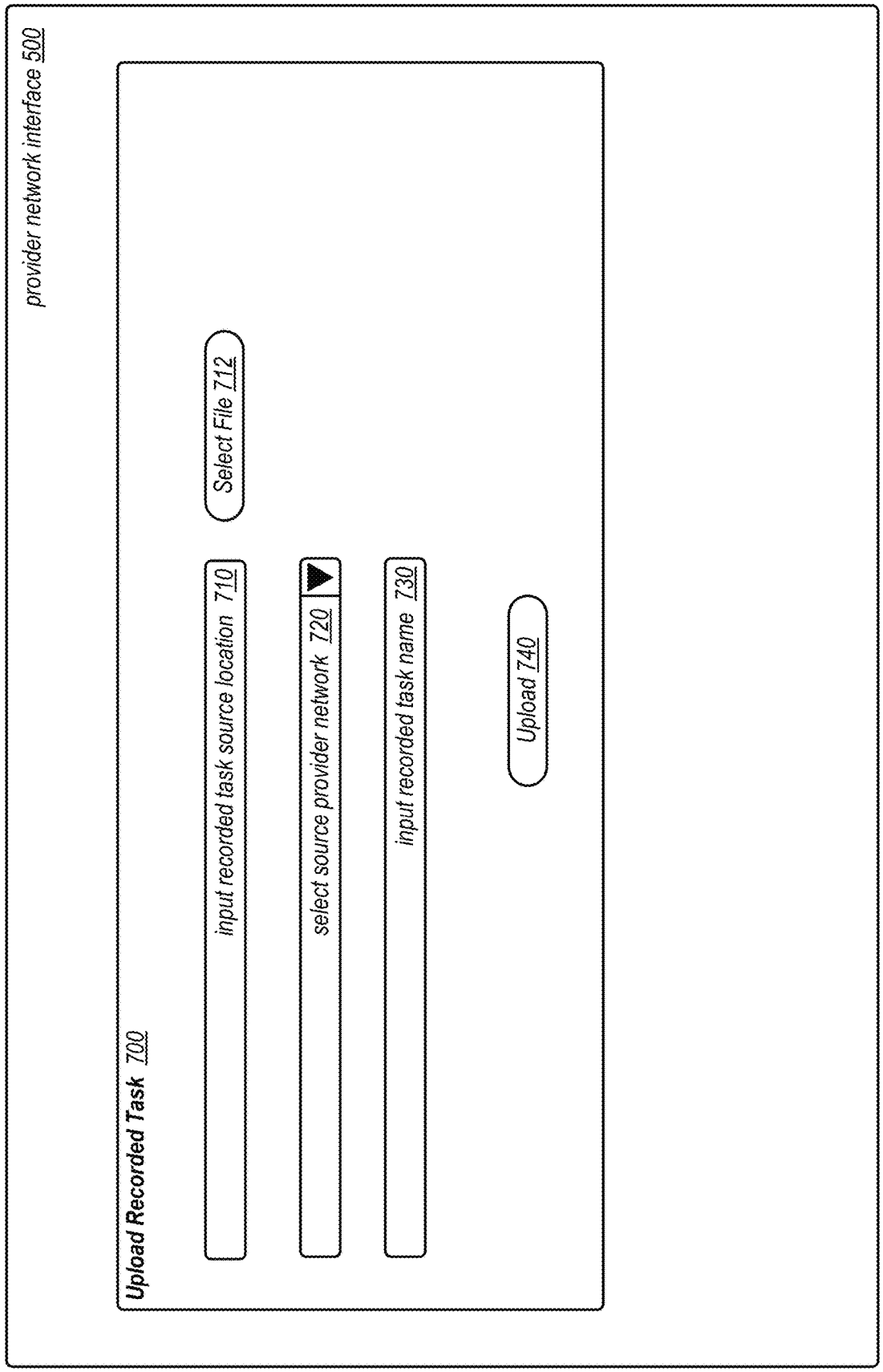
FIG. 7 is an example illustration of a graphical user interface for uploading and translating previously recorded tasks to a provider network, according to some embodiments.

As illustrated in FIG. 6, in some embodiments, an element 612 may be implemented that allows a client to upload a recorded task. FIG. 7 is an example illustration of a graphical user interface for uploading and translating previously recorded tasks to a provider network, according to some embodiments. Uploaded recorded task element 700 may implement various elements to upload recorded tasks. For example, input recorded task source location 710 may be a file location, network address, or other location to obtain the recorded task. Select file element 712 may be implemented to trigger a file exploration dialog box, in some embodiments, allowing a client to determine the recorded task source location by browsing file storage. Upload recorded task element 700 may implement an interface element 720 to identify the source provider network for with the task was recorded. For example, a drop down menu listing other provider networks may be provided, indicating those provider networks for which upload and translation of the recorded task is available. Task name element 730 may be implemented at uploaded recorded task 700 in order to provide a task name for the uploaded task (e.g., a text input element). Selection of upload element 740 may trigger the transfer and translation of the recorded task. Success or failure indications may be displayed. In various embodiments, a successfully uploaded task may be displayed in an interface similar to that described above with regard to FIG. 6.

Figure 8:
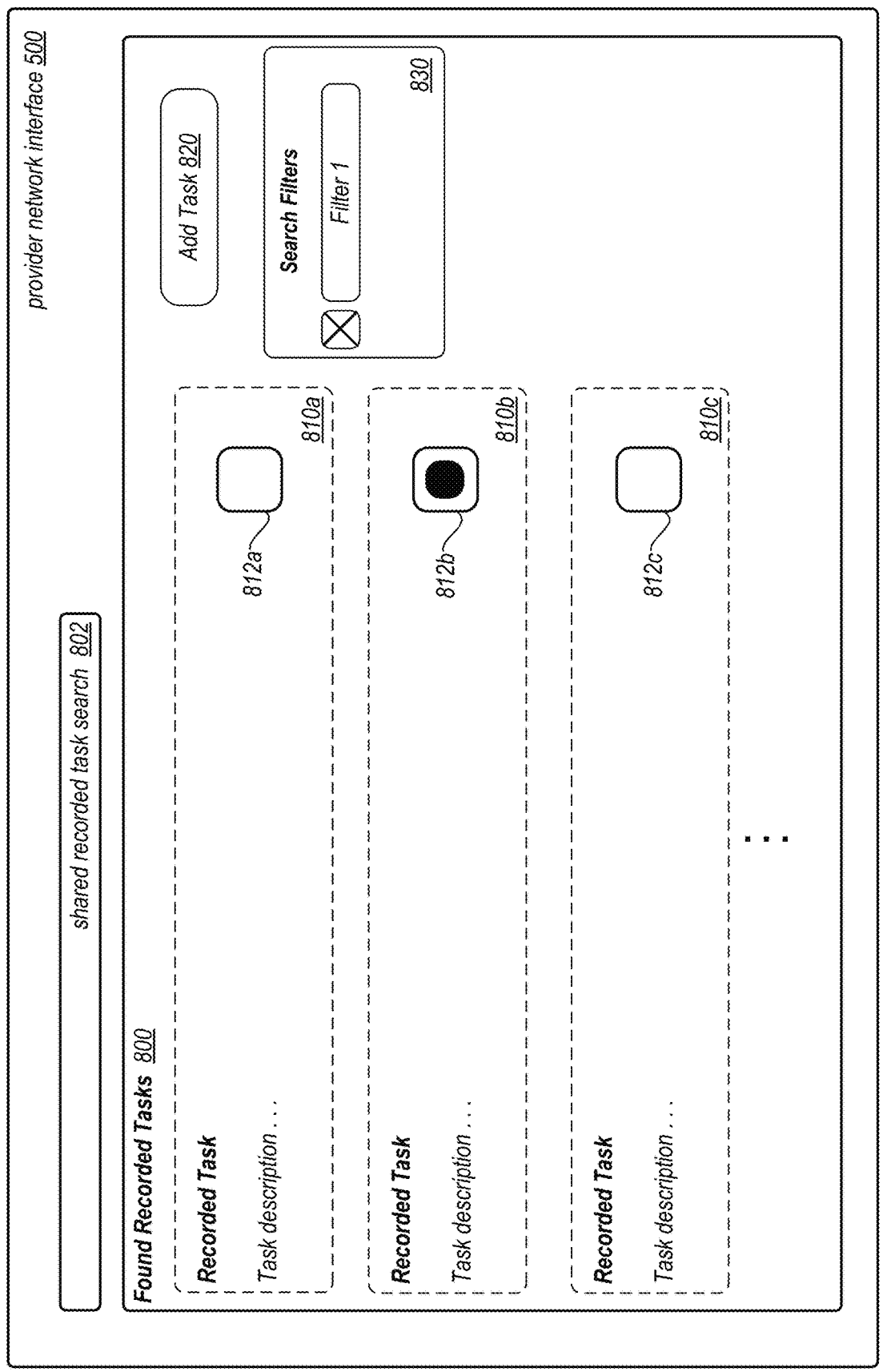
FIG. 8 is an example illustration of a graphical user interface for obtaining recorded tasks published to a recorded task distribution platform, according to some embodiments.

As illustrated in FIG. 6, in some embodiments, an element 614 may be implemented that allows a client to add a shared task recorded for another client of a provider network. FIG. 8 is an example illustration of a graphical user interface for obtaining recorded tasks published to a recorded task distribution platform, according to some embodiments. As discussed above, a recorded task distribution platform may facilitate the sharing of tasks recorded and stored at a task capture and management service to be used and configured for other clients that did not record the task initially. A shared or published task discovery mechanism may be implemented in various embodiments to facilitate the discovery of shared tasks. For example, various categories, tags, or labels may be applied tasks based on resource type, key words, or action type. In some embodiments, shared recorded task search element 802 may be implemented to provide an input for search criteria to be used to display potential recorded tasks. In at least some embodiments, recorded tasks may be indexed according to their respective task actions, as the task actions may be easily understood by a task capture and management service, and need not rely solely upon descriptive information submitted by a client that published the recorded task.

In at least some embodiments, found recorded tasks element 800 may be implemented. Different listings of recorded tasks 810, such as listings 810a, 810b, and 810c, which satisfy the search criteria, may be displayed. Descriptive information about the task, resources acted upon, actions performed, task parameters, or any other information configurable by a client may be described for a recorded task listing 810. In some embodiments, additional discovery elements such as search filter element 830 may be implemented to narrow down search results that are large. Selection elements 812a, 812b, and 812c may allow a client to select one or more recorded tasks to add to a customer account in response to the selection of the add task element 820.

As discussed above, in some embodiments, multiple recorded tasks may be linked together to execute as a recorded task workflow. FIG. 9 is an example illustration of a graphical user interface for managing a recorded task workflow, according to some embodiments. Provider network interface 500 may implement a discovery mechanism for recorded task workflows associated with a customer account. For example, recorded task workflow search element 902 may be implemented, allowing search terms for specific recorded task workflows associated with a customer account to be used lookup matching recorded task workflows. My recorded task workflows element 910 may be implemented to display all or matching recorded task workflows for a customer account. For example, recorded task workflow A may be described in element 912a, and selectable for further management by element 914a. Recorded task workflow B may be described in element 912b, and selectable for further management by element 914b. Recorded task workflow C may be described in element 912c, and selectable for further management by element 914c.

As illustrated in FIG. 9, recorded task workflow A may be selected. Workflow detail view element 920 may be implemented to illustrate how recorded task workflow A logically executes. Please note various other graphical and non-graphical (e.g., textual) ways of providing a detailed view of recorded task workflow may be implemented and thus following discussion is not intended to be limiting. For instance, execution events 922a and 922f may be illustrated as triggering the performance of recorded task 922c and 922g. Recorded tasks 922d and 922e may be illustrated as both performed upon completion of recorded task 922. Task parameter input(s) 924 may be illustrated, as well as a source for parameter values may be illustrated in some embodiments. For example workflow rule set 922b (which may include task parameter definitions that override task parameter definitions in individual task rule sets for recorded tasks) may provide parameter values to parameter inputs 924 for tasks 922c, 922d, 922e, and 922g. In some embodiments, the performance of other tasks may provide the inputs for the tasks, such as task 922c providing parameter input for task 922e. Execution events, such as 922f, may provide parameter inputs for tasks, such as 922f. Workflow rule set 922b, like task rule sets described above may provide rules, definitions, or other information to perform a recorded task workflow. Workflow rule set 922b may, for instance, describe the relationships, ordering, or other performance information that defines the path arrows between tasks and events 922.

In some embodiments, a workflow toolbar 930 may be implemented to allow a client to visually edit a workflow, such as recorded task workflow A displayed in workflow detail view element 920. For example, add task element 932 may allow a client to add a task to workflow (e.g., visual drop and drag from a set of available recorded tasks). Selection of modify task element 934 may allow a client to select a recorded task in detail view 920 and modify actions or task parameters (similar to FIG. 6 discussed above). Selection of modify execution element 936 may allow a client to select an execution event to modify an execution event (e.g., changing thresholds, monitored data, indications, or other information that triggers the execution event) by selecting the execution event to modify. New execution events may also be configured and added, placing them into detailed view 920. Modify rule set 938 may trigger an editing interface for modifying the various portions of a workflow rule set, such as parameter definitions, links between tasks and events, or any other information for performing the recorded task workflow. Although not illustrated, in a least some embodiments, recorded task workflows may be shared or published, such as to a recorded task distribution platform (similar to sharing a recorded task as discussed above with regard to FIG. 6). Similarly, recorded task workflows may be obtained from a task distribution platform and added to or associated with a particular customer account for configuration and/or execution on behalf of the particular customer account.

The clients, provider network, network-based services, task capture and management service, and other components that implement capture and management of provider network tasks discussed above with regard to FIGS. 2-9 have been given as examples. Various other types or configurations of clients, provider network, network-based services, a task capture and management service, and other components may implement these techniques. Thus, FIG. 10 is high-level flowchart illustrating various methods and techniques for providing task capture and execution, according to some embodiments.

As indicated at 1010, task action(s) performed with respect to resource(s) implemented at a provider network to generate a recorded task may be captured based, at least in part, on task input(s) received from a client of the provider network via a network-based interface. Task inputs may be received for a manual user interface (e.g., a graphical user interface or command line interface). The inputs themselves may be recorded and evaluated to determine the task actions performed as a result of the task inputs. In at least some embodiments, task actions may be different from task inputs, for example a set of API commands as opposed to a log of user interface actions (e.g., element A clicked, then element B received text string, etc.). In at least some embodiments, recorded task actions may be different from task inputs, and thus executing a recorded task may be an execution of the recorded tasks instead of a replay of the task inputs. As discussed below with regard to FIG. 11, a task rule set may be generated for the recorded task, including task parameter definitions and execution event definitions, in some embodiments. Once the task actions performed for the task are captured, the recorded task may be stored, as indicated at 1020, for subsequent execution. For example, an executable file may be created that performs the task actions according to the task rule set, that is stored and executed in response to an execution event.

One (or more) execution events for the recorded task may be evaluated, as indicated at 1030. The execution events may describe some scenario, threshold, indication, notification, performance metric, or other information that triggers the execution of the recorded task. In some embodiments, the execution event for a recorded task may be the completion of another recorded task linked to the recorded task and performed as part of a recorded task workflow, as discussed above with regard to FIG. 9. If no execution event is detected, then the execution event may be monitored or evaluated (periodically, or aperiodically). If, as indicated by the positive exit from 1030 that an execution event for the recorded task is detected, then the task action(s) described in the recorded task may be performed with respect to the resources implemented at the provider network. For example, actions to modify, start, stop, remove or add resources (e.g., compute instances, storage, load balancers, or other resources as discussed above with regard to FIG. 2). Multiple actions may be performed, for some recorded tasks, whereas other recorded tasks may include only a single task action. In at least some embodiments, a recorded task action may perform task actions with regard to resources implemented as part of different network-based services.

As noted earlier, recorded tasks may be configured to work in very specific or very general ways. Some recorded tasks may perform the exact same actions every time the recorded task is executed. While other tasks may perform differently at different executions of the recorded task, creating a template that may be dynamically populated when performed. Providing flexibility to recorded tasks may be accomplished when the recorded tasks are capture (or later modified as discussed above with regard to FIG. 6). FIG. 11 is a high-level flowchart illustrating various methods and techniques for capturing a task, according to some embodiments.

As indicated at 1110, task input(s) received via a network-based interface for a provider network as part of capturing a task action(s) to generate a recorded task may be evaluated. For example a log or other set of data describing task inputs may be maintained and analyzed to determine the specific ways in which task actions may be produced based on the task inputs received. As noted earlier with regard to FIGS. 5A-5D, task parameters may be identified as part of the task inputs. These inputs may be statically or dynamically defined, in some embodiments. Based on the evaluation of these inputs, task parameter(s) for the task action(s) may be defined, as indicated at 1120, in some embodiments. For example, a task input that is to be the same value at each performance of the recorded task may be defined as a static task parameter for the recorded task. Whereas, a task input that is identified as a variable or template that may for which the parameter value may be dynamically determined (e.g., at runtime), may be defined as dynamic. Rule(s) for dynamically determining the parameter value, whether as input from another task, data source (e.g., database, notification system), or execution event (e.g., the identifier of the resource to change as part of the recorded task), may be described that can identify a parameter value for a particular performance of the recorded task.

In at least some embodiments, execution event(s) may be defined for the recorded task, as indicated at 1130. Although it must be noted that execution event(s) may be later defined or configured (as discussed above with regard to FIG. 6, enabling execution or configuring execution events). A task rule set may be generated for executing the recorded task based, at least in part, on the defined task parameter(s) and defined execution event(s), as indicated at 1140, in some embodiments. For example, the task rule set may be generated in machine or human-readable format (e.g., for manual editing) and may be stored along with information to perform the task actions (e.g., whether separately in addition to generated API or other commands to perform the task actions, or together as an executable that performs the task actions).

Figure 12:
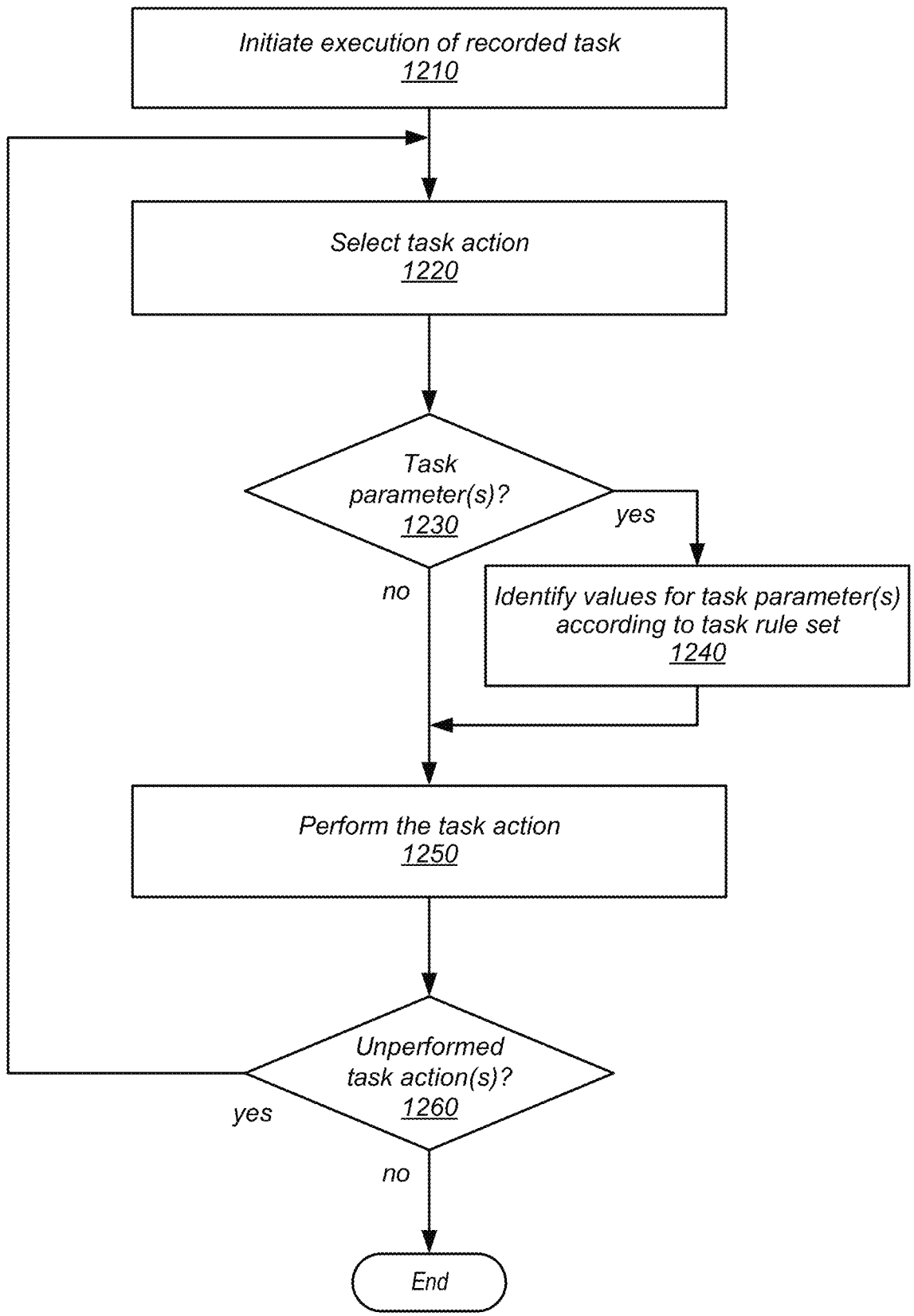
FIG. 12 is a high-level flowchart illustrating various methods and techniques for performing a recorded task, according to some embodiments.

In order to execute the various configurations of recorded tasks, task parameters and/or task rule sets may be accounted for when performing some recorded tasks. FIG. 12 is a high-level flowchart illustrating various methods and techniques for performing a recorded task, according to some embodiments. As indicated at 1210, execution of a recorded task has been initiated, in response to detected execution event for the task. As indicated at 1220, a task action may be selected to be performed. For example, in some embodiments, the task actions may follow an ordering or sequence, and thus the selected task may be next in the ordering or sequence. Some recorded tasks, however, may allow for some task actions to be performed in-parallel with other task actions. A task rule set may describe or indicate how task actions may be selected.

As indicated at 1230, if no task parameters are involved with performing the task, then the task may be performed, as indicated at 1250. For example, one or more API commands may be sent to network-based service(s) implementing the resource(s) for which the recorded task is performed. If task parameter(s) are included in a task action (which may be indicated in the task rule set), then values for the task parameter(s) may be identified according to the task rule set. Statically defined task parameters, for instance, may have the static value recorded in the rule set, while dynamically determined values may necessitate the performance of one or more other actions to determine the value (e.g., check for a notification or indication, access a database, wait for another task to complete, etc.). Once identified, the task parameter(s) for the task action may be utilized to perform the task action, as indicated at 1250. For example, the task parameters may be utilized to populate fields, flags, or tags for request messages formatted according to APIs for the resource(s). If remaining task action(s) are not performed, then as indicated by the positive exit form 1260, the technique illustrated in FIG. 12 may be repeated. If, however, all task actions are performed, then execution of the recorded task may end, as indicated by the negative exit from 1260.

Figure 13:
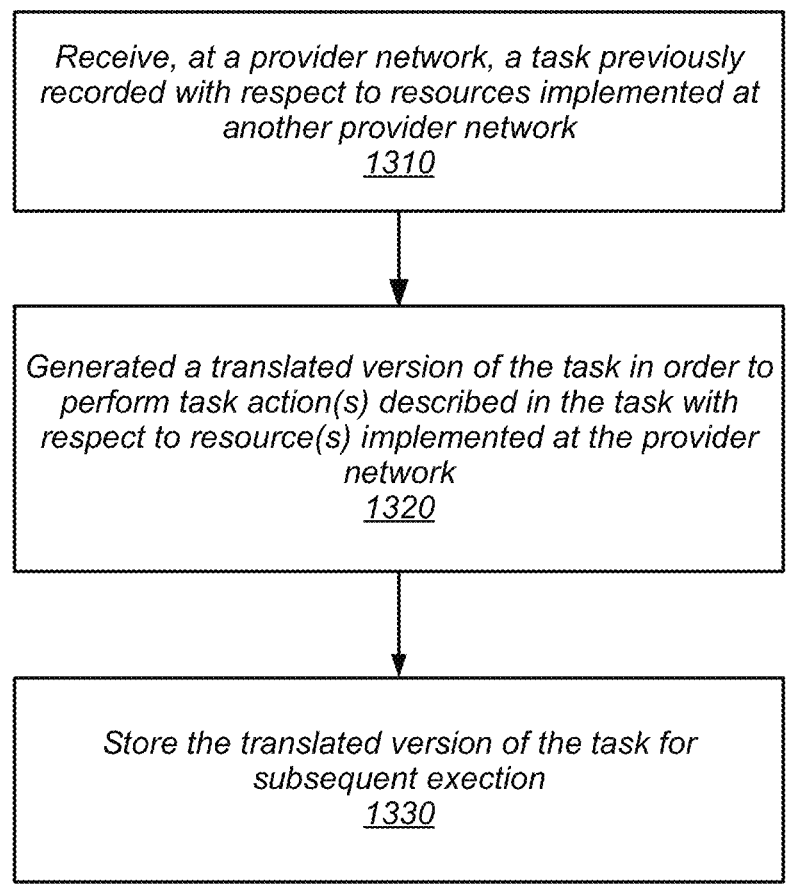
FIG. 13 is a high-level flowchart illustrating various methods and techniques for generating translated versions of previously recorded tasks, according to some embodiments.

As noted earlier, some recorded tasks may be uploaded which were previously recorded for other provider networks. FIG. 13 is a high-level flowchart illustrating various methods and techniques for generating translated versions of previously recorded tasks, according to some embodiments. As indicated at 1310, a task previously recorded at another provided network with respect to other resources at the other provider network may be received at a provider network, in some embodiments. As indicated at 1320, a translated version of the task may be generated in order to perform task action(s) described in the task with respect to resource implemented at the provider network. For example, programming interfaces (APIs) or software development kits (SDKs), may be maintained for the other provider networks and utilized by a translation engine to construct task actions formatted according to APIs for the current provider network. The translated version of the task may then be stored for subsequent execution on behalf of the client, as indicated at 1330. Similar to element 1020 discussed above, the translated version of the recorded task may be stored as an executable or set of instructions (including a task rule set) to perform the task actions. Translated versions of received tasks may be modified and/or configured as other recorded tasks, in some embodiments. In at least some embodiments, similar techniques may be performed to receive a recorded task workflow that is previously recorded for another provider network. Translated versions of one or more recorded tasks in the recorded task workflow may be generated and stored for subsequent execution of the received recorded task workflow.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may be configured to implement the functionality described herein (e.g., the functionality of various servers and other components that implement the client and/or provider network described herein). The various methods as illustrated in the figures and described herein represent example embodiments of methods. The order of any method may be changed, and various elements may be added, reordered, combined, omitted, modified, etc.

Figure 14:
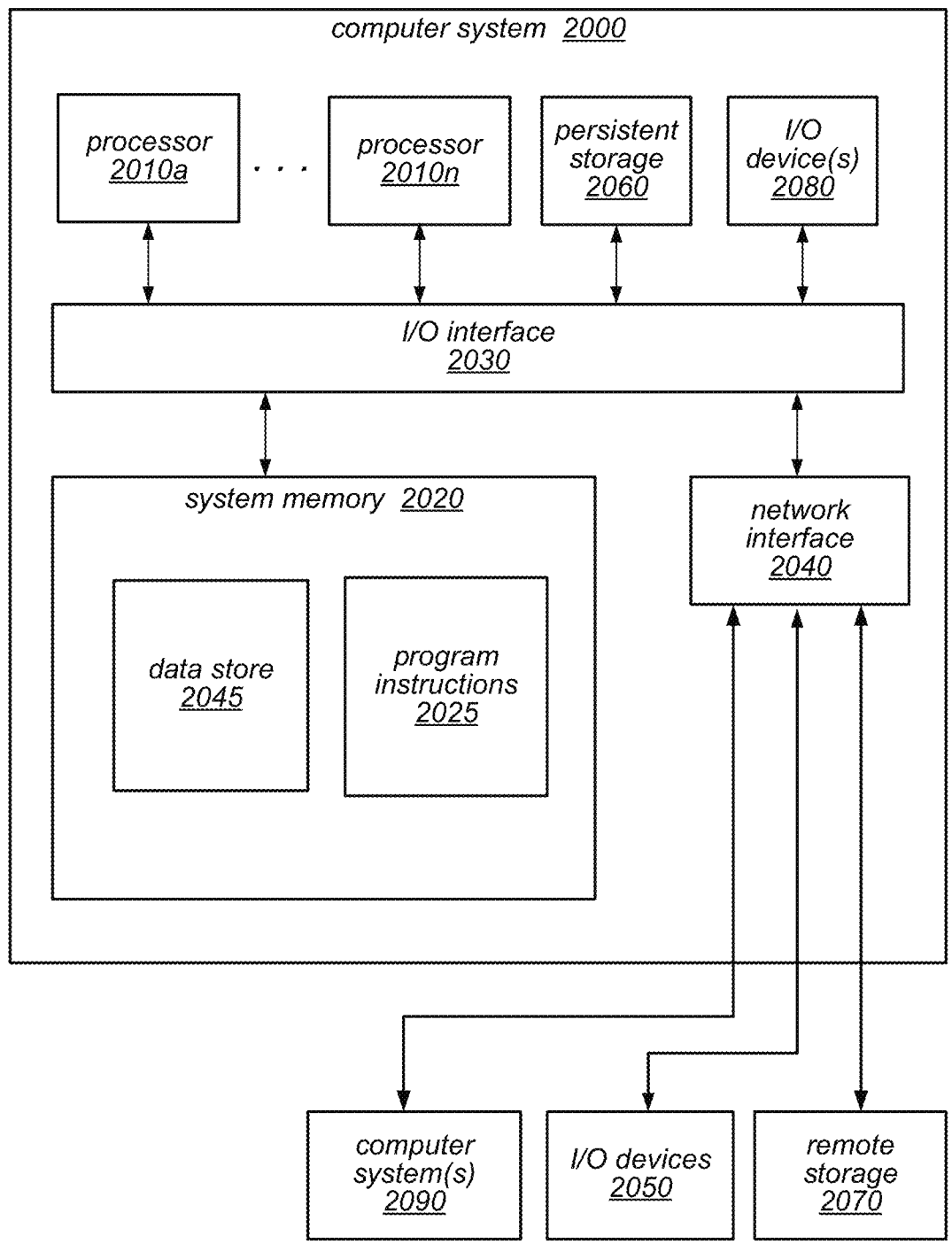
FIG. 14 is a block diagram illustrating an example computing system, according to some embodiments.

Embodiments of automated management of resource attributes across network-based services as described herein may be executed on one or more computer systems, which may interact with various other devices. FIG. 14 is a block diagram illustrating an example computer system, according to various embodiments. For example, computer system 2000 may be configured to implement nodes or resources of a provider network, network-based service, such as a task capture and management service, a data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the system described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a task capture and management module/system/service, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 14 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A provider network, comprising:
a plurality of network-based resources comprising a plurality of virtual machines;
a network-based interface for the provider network;
one or more hardware processors and memory to implement a task capture and management module to:
receive a plurality of task inputs from a client of the provider network via the network-based interface;
based at least in part on the received plurality of task inputs, record a plurality of task actions performed with respect to a set of one or more of the plurality of virtual machines provided to the client to generate a recorded task for subsequent execution, wherein the plurality of task actions modify the set of virtual machines, and wherein the plurality of task inputs received from the client cause, at least in part, the plurality of task actions to be both recorded and performed;
store the recorded task for subsequent execution;
provide, to the client of the provider network, a graphical user interface comprising graphical elements for a plurality of available recorded tasks, including the recorded task, and one or more graphical elements for graphically selecting and adding one or more of the available recorded tasks to a recorded task workflow;
select, based on input received from the client via the graphical user interface, a plurality of recorded tasks, task execution events for at least some of the plurality of recorded tasks, and at least some links between at least some of the plurality of recorded tasks, to create a recorded task workflow comprising a plurality of linked recorded tasks, wherein at least one of the plurality of recorded tasks is selected based at least in part on the client's interaction, received in the input, with one or more of the graphical elements for the plurality of available recorded tasks, and one or more of the graphical elements for graphically selecting and adding one or more of the available recorded tasks to a recorded task workflow, wherein the plurality of linked recorded tasks comprise the recorded task comprising the plurality of task actions, wherein the task execution events comprise a particular task execution event for the recorded task, and wherein individual recorded tasks of the recorded task workflow comprise a plurality of task actions that are separately recorded by the task capture and management module from other recorded tasks of the plurality of linked recorded tasks;
perform a search for a published recorded task to add to the recorded task workflow according to one or more search filters received via the graphical user interface;
select the published recorded task from among results of the search to add to the recorded task workflow according to user selection received via the graphical user interface;
execute the recorded task as part of the recorded task workflow, wherein the execution of the recorded task comprises, detecting the particular task execution event for the recorded task during execution of the recorded task workflow, and in response to detection of the particular task execution event for the recorded task during execution of the recorded task workflow:
access the recorded task; and
perform the plurality of task actions recorded in the recorded task in order to execute the recorded task with respect to the one or more network-based resources implemented at the provider network; and
execute at least another recorded task of the plurality of linked recorded tasks of the recorded task workflow, wherein the execution of the other recorded task is triggered by the performance of one or more of the plurality of task actions of the recorded task, and wherein the other recorded task comprises a plurality of separately recorded task actions.

2. The provider network of claim 1,
wherein to record the plurality of task actions performed with respect to the one or more virtual machines implemented at the provider network to generate the recorded task, the task capture and management module is configured to:
define one or more task parameters for the plurality of task actions based, at least in part, on an evaluation of the plurality of task inputs;
define one or more execution events for the recorded task including the detected execution event;
generate a task rule set for executing the recorded task based, at least in part, on the defined one or more task parameters and the defined one or more execution events for the recorded task; and
wherein to perform the plurality of task actions as described in the recorded task, the task capture and management module is configured to:
identify respective values for the one or more task parameters as defined in the task rule set such that respective values for the one or more task parameters are included in the performance of the one or more task actions.

3. The provider network of claim 1, wherein the one or more network-based resources of the provider network are implemented as part of one or more network-based services implemented at the provider network, and wherein the task capture and management module is implemented as one of the plurality of network-based services.

4. A method, comprising:
performing, by one or more computing devices comprising one or more hardware processors and memory:
receiving a plurality of task inputs from a client of a provider network via a network-based interface for the provider network;
based at least in part on the received plurality of task inputs, capturing a plurality of task actions performed with respect to a set of one or more network-based resources, comprising one or more virtual machines, implemented at the provider network for the client to generate a recorded task for subsequent execution, wherein the plurality of task actions modify the set of network-based resources, and wherein the plurality of task inputs received from the client cause, at least in part, the plurality of task actions to be both performed and captured;
storing the recorded task for subsequent execution;
providing, to the client of the provider network, a graphical user interface comprising graphical elements for a plurality of available recorded tasks, including the recorded task, and one or more graphical elements for graphically selecting and adding one or more of the available recorded tasks to a recorded task workflow;

selecting, based on input received from the client via the graphical user interface, a plurality of recorded tasks, task execution events for at least some of the plurality of recorded tasks, and at least some links between at least some of the plurality of recorded tasks, to create a recorded task workflow comprising a plurality of linked recorded tasks, wherein at least one of the plurality of recorded tasks is selected based at least in part on the client's interaction, received in the input, with one or more of the graphical elements for the plurality of available recorded tasks, and one or more of the graphical elements for graphically selecting and adding one or more of the available recorded tasks to a recorded task workflow, wherein the plurality of linked recorded tasks comprise the recorded task comprising the plurality of task actions, wherein the task execution events comprise a particular task execution event for the recorded task, and wherein individual recorded tasks of the recorded task workflow comprise a plurality of task actions that are separately recorded from other recorded tasks of the plurality of linked recorded tasks;

performing a search for a published recorded task to add to the recorded task workflow according to one or more search filters received via the graphical user interface;

selecting the published recorded task from among results of the search to add to the recorded task workflow according to user selection received via the graphical user interface;

executing the recorded task as part of the recorded task workflow, wherein the execution of the recorded task comprises:
  detecting the particular task execution event for the recorded task during execution of the recorded task workflow; and
  in response to detecting the particular task execution event for the recorded task during the execution of the recorded task workflow, accessing the recorded task, and performing the plurality of task actions of the recorded task in order to execute the recorded task with respect to the one or more network-based resources implemented at the provider network; and executing at least another recorded task of the plurality of linked recorded tasks of the recorded task workflow, wherein the execution of the other recorded task is triggered by the performance of one or more of the plurality of task actions of the recorded task, and wherein the other recorded task comprises a plurality of separately recorded task actions.

5. The method of claim 4, wherein capturing the plurality of task actions comprises:
  defining one or more task parameters for the plurality of task actions based, at least in part, on an evaluation of the plurality of task inputs;
  defining one or more execution events for the recorded task including the detected execution event; and
  generating a task rule set for executing the recorded task based, at least in part, on the defined one or more task parameters and the defined one or more execution events for the recorded task.

6. The method of claim 5, wherein performing the plurality of task actions as described in the recorded task comprises identifying respective values for the one or more task parameters as defined in the task rule set such that respective values for the one or more task parameters are included in the performance of the one or more task actions.

7. The method of claim 6, wherein another execution event is detected for the recorded task, wherein in response to detecting the other execution event the plurality of task actions are performed as described in the recorded event, and wherein at least one of the respective values for the one or more task parameters identified for the performance of the recorded task in response to the other execution event is different than at least one of the respective values for the one or more task parameters identified for the performance of the recorded task in response to the execution event.

8. The method of claim 4, further comprising:
  publishing the recorded task workflow to a recorded task distribution platform for the provider network such that the recorded task workflow is available for execution on behalf of a different client than the client of the provider network.

9. The method of claim 4, further comprising:
  generating a source code version of the recorded task; and
  providing the source code version of the recorded task to a client of the provider network.

10. The method of claim 4, further comprising:
  publishing the recorded task to a recorded task distribution platform for the provider network such that the recorded task is available for execution on behalf of a different client than the client of the provider network.

11. The method of claim 4, further comprising:
  receiving a task previously recorded with respect to one or more other network-based resources implemented at another provider network;
  generating a translated version of the received task in order perform plurality of task actions described in the received task with respect to a corresponding one or more network-based resources implemented at the provider network; and
  storing the translated version of the received task for subsequent execution at the provider network.

12. The method of claim 4, wherein the network-based interface for the provider network is a graphical user interface, and wherein the plurality of task inputs received via the network-based interface are received via one or more user interface elements implemented as part of the graphical user interface.

13. A non-transitory, computer-readable storage medium, storing program instructions that when executed by one or more computing devices, comprising one or more hardware processors and memory, cause the one or more computing devices to implement:
  receiving a plurality of task inputs from a client of a provider network via a network-based interface for the provider network;
  based at least in part on the received plurality of task inputs, recording a plurality of task actions performed with respect to a set of one or more network-based resources, comprising one or more virtual machines, implemented at the provider network for the client to generate a recorded task for subsequent execution, wherein the plurality of task actions modify the set of network-based resources, and wherein the plurality of task inputs received from the client cause, at least in part, the plurality of task actions to be both performed and recorded;

storing the recorded task for subsequent execution;
providing, to the client of the provider network, a graphical user interface comprising graphical elements for a plurality of available recorded tasks, including the recorded task, and one or more graphical elements for graphically selecting and adding one or more of the available recorded tasks to a recorded task workflow;
selecting, based on input received from the client via the graphical user interface, a plurality of recorded tasks, task execution events for at least some of the plurality of recorded tasks, and at least some links between at least some of the plurality of recorded tasks, to create a recorded task workflow comprising a plurality of linked recorded tasks, wherein at least one of the plurality of recorded tasks is selected based at least in part on the client's interaction, received in the input, with one or more of the graphical elements for the plurality of available recorded tasks, and one or more of the graphical elements for graphically selecting and adding one or more of the available recorded tasks to a recorded task workflow, wherein the plurality of linked recorded tasks comprise the recorded task comprising the plurality of task actions, wherein the task execution events comprise a particular task execution event for the recorded task, and wherein individual recorded tasks of the recorded task workflow comprise a plurality of task actions that are separately recorded from other recorded tasks of the plurality of linked recorded tasks;
performing a search for a published recorded task to add to the recorded task workflow according to one or more search filters received via the graphical user interface;
selecting the published recorded task from among results of the search to add to the recorded task workflow according to user selection received via the graphical user interface;
executing the recorded task as part of the recorded task workflow, including, detecting the particular task execution event for the recorded task during execution of the recorded task workflow, and in response to detecting the particular task execution event for the recorded task during execution of the recorded task workflow:
accessing the recorded task; and
performing the plurality of task actions recorded in the recorded task in order to execute the recorded task with respect to the one or more network-based resources implemented at the provider network; and
executing at least another recorded task of the plurality of linked recorded tasks of the recorded task workflow, wherein the execution of the other recorded task is triggered by the performance of one or more of the plurality of task actions of the recorded task, and wherein the other recorded task comprises a plurality of separately recorded task actions.

14. The non-transitory, computer-readable storage medium of claim 13,
wherein, in recording the plurality of task actions performed with respect to the one or more network-based resources implemented at the provider network to generate the recorded task, the program instructions cause the one or more computing devices to implement:
defining one or more task parameters for the plurality of task actions based, at least in part, on an evaluation of the plurality of task inputs;
generating a task rule set for executing the recorded task based, at least in part, on the defined one or more task parameters for the recorded task;
wherein, in performing the plurality of task actions as described in the recorded task, the program instructions cause the one or more computing devices to implement:
identifying respective values for the one or more task parameters as defined in the task rule set such that respective values for the one or more task parameters are included in the performance of the one or more task actions.

15. The non-transitory, computer-readable storage medium of claim 14, wherein another execution event is detected for the recorded task, wherein in response to detecting the other execution event the plurality of task actions are performed as described in the recorded event, and wherein at least one of the respective values for the one or more task parameters identified for the performance of the recorded task in response to the other execution event is different than at least one of the respective values for the one or more task parameters identified for the performance of the recorded task in response to the execution event.

16. The non-transitory, computer-readable storage medium of claim 13, wherein the program instructions cause the one or more computing devices to further implement:
obtaining another recorded task from a recorded task distribution platform for the provider network that was previously recorded for a different client of the provider network than the client; and
executing the recorded task on behalf of the client.

17. The non-transitory, computer-readable storage medium of claim 13, wherein the program instructions cause the one or more computing devices to further implement:
receiving a task workflow previously recorded with respect to one or more other network-based resources implemented at another provider network;
generating a translated version of the received task workflow in order perform one or more recorded tasks described in the received task workflow with respect to a corresponding one or more network-based resources implemented at the provider network; and
storing the translated version of the received task workflow for subsequent execution at the provider network.

18. The non-transitory, computer-readable storage medium of claim 13, wherein the one or more network-based resources of the provider network are implemented as part of one or more network-based services implemented at the provider network, and wherein at least one of the one or more network-based resources is implemented at a different network-based service than at least another one of the one or more network-based resources.

* * * * *